(12) United States Patent
Ooshima et al.

(10) Patent No.: US 7,558,524 B2
(45) Date of Patent: Jul. 7, 2009

(54) IMAGE READING SYSTEM

(75) Inventors: Toshiaki Ooshima, Nagano (JP);
Kenichiro Amemiya, Nagano (JP);
Noriyuki Noda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 146 days.

(21) Appl. No.: 11/021,711

(22) Filed: Dec. 23, 2004

(65) Prior Publication Data
US 2005/0191100 A1    Sep. 1, 2005

Related U.S. Application Data

(63) Continuation-in-part of application No. 10/378,399, filed on Mar. 3, 2003.

(30) Foreign Application Priority Data
Mar. 1, 2002    (JP) ............... P. 2002-055554

(51) Int. Cl.
*G03G 15/00*    (2006.01)
(52) U.S. Cl. ............... 399/370; 399/376; 358/449; 358/474
(58) Field of Classification Search ............... 399/370, 399/376; 358/442–489; *G03G 15/00*
See application file for complete search history.

(56) References Cited

U.S. PATENT DOCUMENTS

| 4,630,127 A | 12/1986 | Fuwa ............... 358/285 |
| 4,870,294 A | 9/1989 | Hasegawa ............... 250/578 |
| 5,122,833 A * | 6/1992 | Sato ............... 399/376 |
| 5,500,725 A * | 3/1996 | Takasu et al. ............... 399/17 |
| 5,568,281 A * | 10/1996 | Kochis et al. ............... 358/475 |
| 5,805,970 A * | 9/1998 | Kasamatsu ............... 399/376 |
| 5,973,797 A * | 10/1999 | Tanaka et al. ............... 358/488 |

FOREIGN PATENT DOCUMENTS

| EP | 0 291 077 A2 | 11/1988 |
| EP | 0 400 490 A2 | 12/1990 |
| GB | 2 237 886 A * | 5/1991 |

(Continued)

OTHER PUBLICATIONS

Japanese Office Action mailed Dec. 21, 2004 (along with English translation thereof).

*Primary Examiner*—Jill E Culler
*Assistant Examiner*—'Wyn' Q Ha
(74) *Attorney, Agent, or Firm*—Edwards Angell Palmer & Dodge LLP

(57) ABSTRACT

There are provided an original table for an original, a linear image sensor for converting light into an electric signal, a first optical system for forming an optical image on a main scanning line onto the linear image sensor, a sub scanning unit for scanning the main scanning line in parallel with a sub scanning direction, and a second optical system forming an optical path that reaches the linear image sensor from a detecting position on the plate surface, which is remote from the main scanning line in a sub scanning direction. A size and an orientation of an original are decided based on an electric signal converted from light that reaches the linear image sensor from the main scanning line via the first optical system, and an electric signal converted from light that reaches the linear image sensor from the detecting position via the second optical system.

4 Claims, 27 Drawing Sheets

FOREIGN PATENT DOCUMENTS

| | | |
|---|---|---|
| JP | 04-211563 | 8/1992 |
| JP | 05-207239 | 8/1993 |
| JP | 06-178057 | 6/1994 |
| JP | 09-191370 | 7/1997 |
| JP | 09-247374 | 9/1997 |
| JP | 11-075025 | 3/1999 |
| JP | 2001-066712 | 3/2001 |
| JP | 2001-069317 | 3/2001 |
| JP | 2002-3168666 | 3/2001 |
| JP | 2002354201 A * | 12/2002 |
| JP | 2003-163797 | 6/2003 |
| JP | 2004-077991 | 3/2004 |

* cited by examiner

FIG. 5

| ORIGINAL SIZE AND ORIENTATION | ABBREVIATION | LENGTH IN MAIN SCANNING DIRECTION (mm) | LENGTH IN SUB SCANNING DIRECTION (mm) |
|---|---|---|---|
| A5 HORIZONTAL | A5H | 210 | 148 |
| B5 HORIZONTAL | B5H | 257 | 182 |
| EXECUTIVE HORIZONTAL | EXH | 266.7 | 184.15 |
| A5 VERTICAL | A5V | 148 | 210 |
| A4 VERTICAL | A4H | 297 | 210 |
| LETTER HORIZONTAL | LTH | 279.4 | 215.9 |
| B5 VERTICAL | B5V | 182 | 257 |
| EXECUTIVE VERTICAL | EXV | 184.15 | 266.7 |
| LETTER VERTICAL | LTV | 215.9 | 279.4 |
| A4 VERTICAL | A4V | 210 | 297 |
| LEGAL VERTICAL | LGV | 215.9 | 355.6 |
| B4 VERTICAL | B4V | 257 | 364 |
| A3 VERTICAL | A3V | 297 | 420 |
| DOUBLE LETTER VERTICAL | WLV | 279.4 | 431.8 |

FIG. 7A

| A | 710-715 |
|---|---|
| B | 3614-3619 |
| C | 4469-4474 |
| D | 5031-5036 |
| E | 5220-5225 |
| F | 6418-6423 |
| G | 6718-6723 |

FIG. 7B

| A5H | A-C |
|---|---|
| B5H | A-E |
| EXH | A-E |
| A5V | A |
| A4H | A-G |
| LTH | A-F |
| B5V | A-B |
| EXV | A-B |
| LTV | A-D |
| A4V | A-C AND P |
| LGV | A-D AND P |
| B4V | A-E AND P |
| A3V | A-G AND P |
| WLT | A-F AND P |

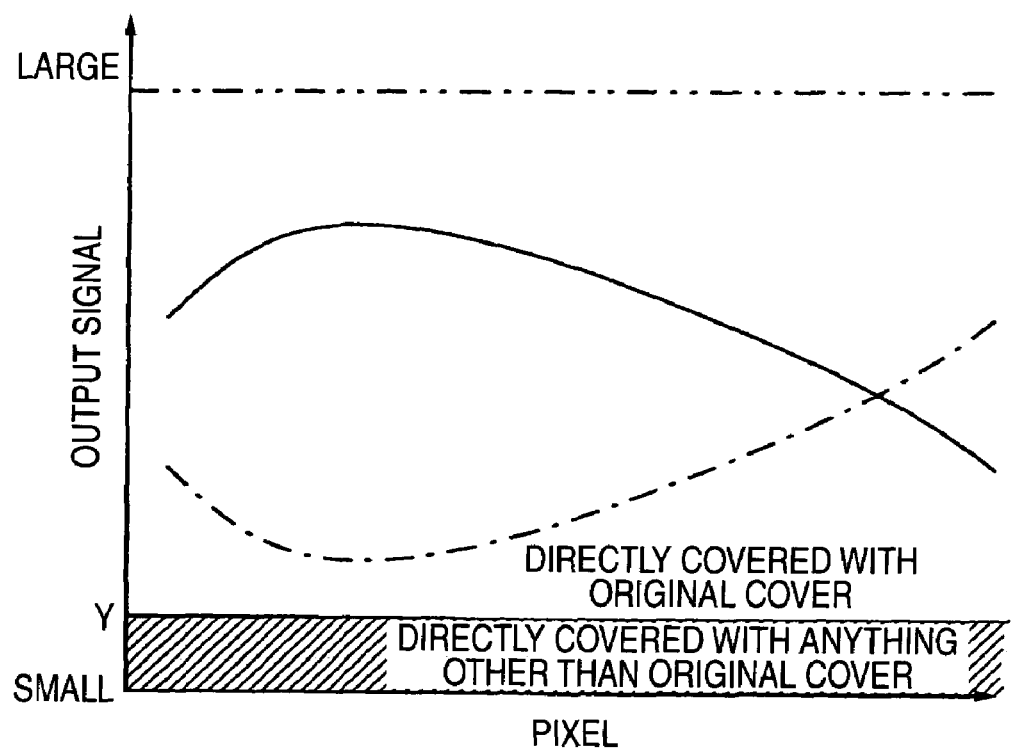

FIG. 18

| DOCUMENT SIZE & DIRECTION | CODE | LENGTH IN MAIN SCANNING DIRECTION (mm) | LENGTH IN SUB SCANNING DIRECTION (mm) |
|---|---|---|---|
| A5 HORIZONTAL | A5H | 210 | 148 |
| B5 HORIZONTAL | B5H | 257 | 182 |
| EXECUTIVE HORIZONTAL | EXH | 266.7 | 184.15 |
| A5 VERTICAL | A5V | 148 | 210 |
| A4 HORIZONTAL | A4H | 297 | 210 |
| LETTER HORIZONTAL | LTH | 279.4 | 215.9 |
| B5 VERTICAL | B5V | 180 | 257 |
| EXECUTIVE VERTICAL | EXV | 184.15 | 266.7 |
| LETTER VERTICAL | LTV | 215.9 | 279.4 |
| A4 VERTICAL | A4V | 210 | 297 |
| LEGAL VERTICAL | LGV | 215.9 | 355.6 |
| B4 VERTICAL | B4V | 257 | 364 |
| A3 VERTICAL | A3V | 297 | 420 |
| DOUBLE LETTER VERTICAL | WLT | 279.4 | 431.8 |

FIG. 22

| VALUE OF CORRESPONDING P | 7 | 6 | 5 | 4 | 3 | 2 | 1 | |
|---|---|---|---|---|---|---|---|---|
| RESULT OF DECISION \ DETECTION POSITION | A | B | C | D | E | F | G | H |
| A5H | – | – | ○ | × | × | × | × | × |
| B5H | – | – | – | – | ○ | × | × | × |
| EXH | – | – | – | – | ○ | × | × | × |
| A5V | ○ | × | × | × | × | × | × | × |
| A4H | – | – | – | – | – | – | ○ | × |
| LTH | – | – | – | – | – | ○ | × | × |
| B5V | – | ○ | × | × | × | × | × | × |
| EXV | – | ○ | × | × | × | × | × | × |
| LTV | – | – | – | ○ | × | × | × | × |
| A4V | – | – | ○ | × | × | × | × | ○ |
| LGV | – | – | – | ○ | × | × | × | ○ |
| B4V | – | – | – | – | ○ | × | × | ○ |
| A3V | – | – | – | – | – | – | ○ | ○ |
| WLT | – | – | – | – | – | ○ | × | ○ |

FIG. 25

| VALUE OF CORRESPONDING P | 8 | 7 | 6 | 5 | 4 | 3 | 2 | 1 | |
|---|---|---|---|---|---|---|---|---|---|
| RESULT OF DECISION \ DETECTION POSITION | A | B | C | D | E | F | G | X | H |
| A5H | − | − | O | × | × | × | × | × | × |
| B5H | − | − | − | − | O | × | × | × | × |
| EXH | − | − | − | − | O | × | × | × | × |
| A5V | O | × | × | × | × | × | × | × | × |
| A4H | − | − | − | − | − | − | O | × | × |
| LTH | − | − | − | − | − | O | × | × | × |
| B5V | − | O | × | × | × | × | × | × | × |
| EXV | − | O | × | × | × | × | × | × | × |
| LTV | − | − | − | O | × | × | × | × | × |
| A4V | − | − | O | × | × | × | × | × | O |
| LGV | − | − | − | O | × | × | × | × | O |
| B4V | − | − | − | − | O | × | × | × | O |
| A3V | − | − | − | − | − | − | O | × | O |
| WLT | − | − | − | − | − | O | × | × | O |
| UNABLE TO DECIDE | − | − | − | − | − | − | − | O | O |
| ABSENCE OF DOCUMENT | × | × | × | × | × | × | × | × | × |

IMAGE READING SYSTEM

The present invention claims benefit from U.S. application Ser. No. 10/378,399 filed on Mar. 3, 2003.

BACKGROUND OF THE INVENTION

The present invention relates to an image reading system.

Generally, as an image reading system for reading an original such as a photograph, a document, etc., an image scanner, an electronic copying apparatus, a facsimile, etc. are known.

In such image reading system, first the size and orientation of an original that is put on an original table are detected, and then reading control, selection of a print paper, etc. are executed based on the detected size and orientation of the original.

As the means for detecting the size and orientation of the original, the means disclosed in Patent Application Hei 4-34200 (Japanese Patent No. 3168666), for example, is employed. The size and orientation of the original can be decided based on a length of the original in the main scanning direction and presence/absence of the original at predetermined positions on the original table. Therefore, in the means disclosed in Patent Application Hei 4-34200 (Japanese Patent No. 3168666), the length of the original in the main scanning direction is detected by a linear image sensor that is used to read the original, while the presence/absence of the original at the predetermined positions on the original table is detected by an optical sensor and light source, both are provided separately from the linear image sensor used to read the original and the light source respectively. Since the optical sensor is provided separately, detecting of the length of the original in the main scanning direction and detecting of the presence/absence of the original can be simultaneously executed. Thus, the size and orientation of the original can be detected in a short time.

As another means for detecting the size and orientation of the original, first the length in the main scanning direction is detected by using the linear image sensor used to read the original, then a carriage on which an optical system for focusing an optical image onto the linear image sensor is mounted is moved in the sub scanning direction, and then the presence/absence of the original at the predetermined positions is detected by using such linear image sensor. Thus, the size and orientation of the original can be detected without the provision of another optical sensor and another light source.

However, if the optical sensor and the light source are provided separately to detect the presence/absence of the original at the predetermined positions on the original table, such a problem is caused that a production cost of the image reading system is increased. In contrast, if the length in the main scanning direction and the presence/absence of the original at the predetermined positions on the original table are detected by moving the carriage while using one linear image sensor, there is no necessity that the optical sensor and the light source should be provided separately, nevertheless such problems are caused that the length in the main scanning direction and the presence/absence of the original at the predetermined positions cannot be detected simultaneously and it takes a lot of time to detect the size and orientation of the original.

SUMMARY OF THE INVENTION

The present invention has been made to overcome the above problems, and it is an object of the present invention to provide an image reading system capable of deciding the size and orientation of an original in a short time without provision of a dedicated sensor.

In order to solve the aforesaid object, the invention is characterized by having the following arrangement.

(1) An image reading apparatus comprising:
  a transparent original table including a surface on which a document is to be placed;
  a light source that irradiates the original table from the back side;
  an image sensor that reads the document by subjecting to photoelectric conversion light reflected from the document placed on the surface of the original table;
  an original cover that is made pivotable from a first position to leave open the surface of the original table to a second position to cover the surface of the original table therewith;
  a document size decision unit that decides a size of the document placed on the surface of the original table on the basis of a change in quantity of light reflected from the document irradiated by the light source during the time the original cover pivots from the first position to the second position.

(2) The image reading apparatus according to (1), wherein the document size decision unit decides that an area on the surface of the original table, corresponding to a pixel quantity of light incident on which comes to have a value not less than a predetermined value when the original table is left open by the original cover, is directly covered with anything other than the original cover.

(3) The image reading apparatus according to (2), wherein the document size decision unit decides whether a plurality of areas on the surface of the original table are covered with the document in the order from an edge portion of the surface of the original table toward a designated placing and holding range of a document of decidable minimal size.

(4) The image reading apparatus according to (1), wherein the document size decision unit decides the size of the document by specifying a pixel in which a variation width of an output signal of the image sensor given at predetermined intervals has a value not less than a predetermined value.

(5) The image reading apparatus according to (1), further comprising:
  a first optical system for forming an optical path led from an area on a main scanning line in parallel to the axis in a longitudinal direction of the linear image sensor in an area on the surface of the original table,
  a subscanning unit that moves the main scanning line in parallel to a subscanning line perpendicular to the main scanning line on the surface of the original table, and
  a second optical system that forms an optical path led from an area apart from the main scanning line toward the subscanning line in the area on the surface of the original table.

(6) An image reading apparatus according to (1), wherein the document size decision unit decides the size of the document on the basis of the quantity of light incident on a pixel of the image sensor within a range which is defined on the surface of the original table, covered with the original cover and located outside a designated placing range of a document of maximum decidable size, and the quantity of light incident on a pixel of the image sensor within the designated placing range of the document of maximum decidable size.

(7) The image reading apparatus according to (1), wherein the image sensor includes a plurality of light receiving parts apart from each other, each of the light receiving parts including a plurality of pixels arranged in parallel to a main scanning line, and the document size decision unit decides the size of the document on the basis of the quantity of light incident on the plurality of pixels which are arranged in the light receiving parts different from each other and are closed to each other.

BRIEF DESCRIPTION OF THE DRAWINGS

FIG. 5 is a table showing the size and orientation of an original, which can be read by the image scanner according to the first embodiment of the present invention.

FIG. 7A is a table showing a correspondence between length detecting positions shown in FIG. 6 and numbers of light receiving elements into which optical images being detected at respective positions are input, and FIG. 7B is a decision table used to decide the size and orientation of the original.

FIG. 10 is a graph according to an embodiment of the invention.

FIG. 18 is a table according to the embodiment of the invention.

FIG. 22 is a table according to the embodiment of the invention.

FIG. 25 is a table according to the embodiment of the invention.

DETAILED DESCRIPTION OF PREFERRED EMBODIMENTS

A plurality of embodiments of the present invention will be explained with reference to the drawings hereinafter.

First Embodiment

Figure 1:
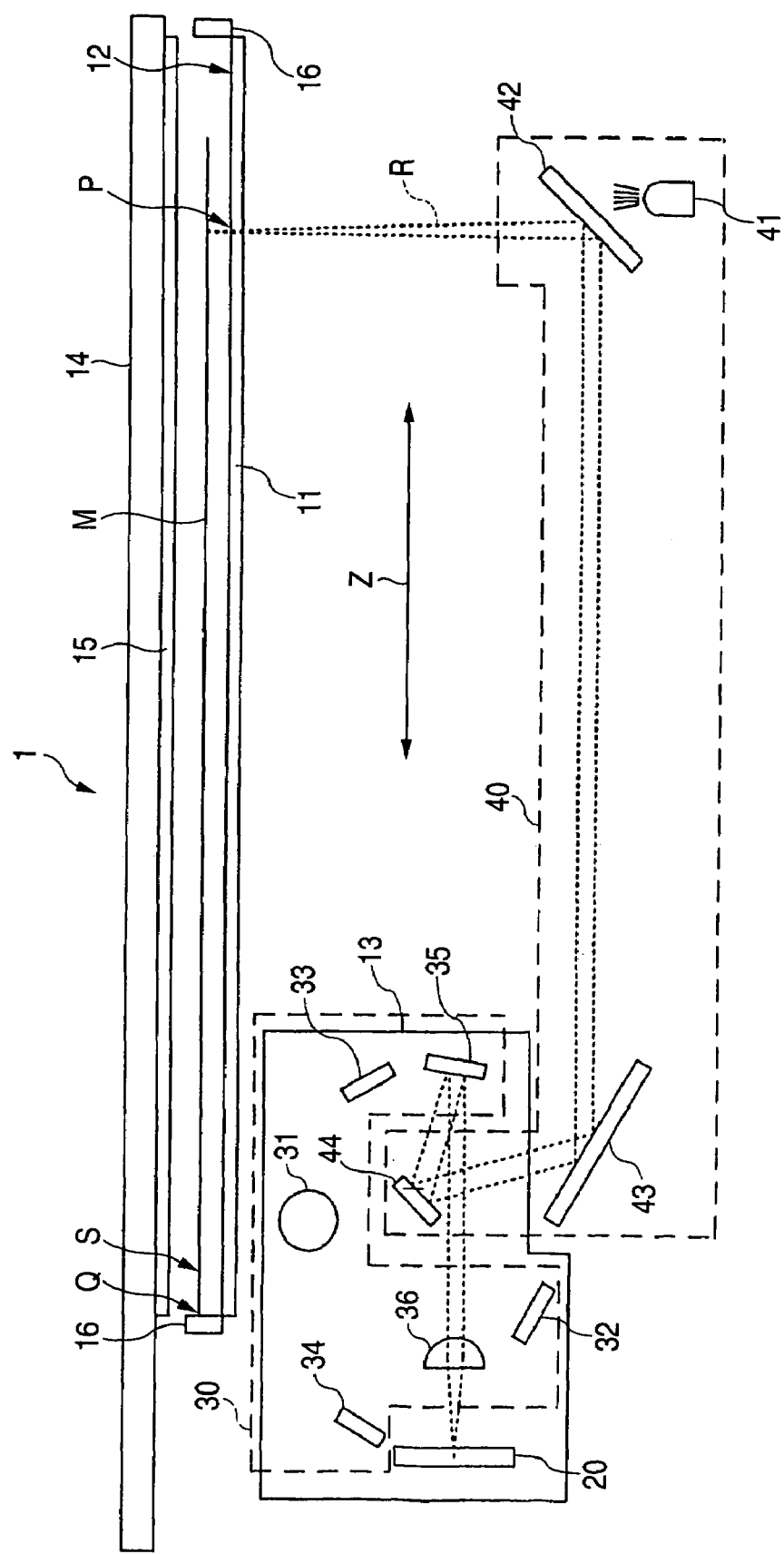
FIG. 1 is a schematic view showing an image scanner according to a first embodiment of the present invention.

FIG. 1 is a schematic view showing an image scanner 1 as an embodiment of an image reading system according to the present invention. The image scanner 1 is a so-called flat bed type in which an original table 11 is provided on an upper surface of a rectangular parallelepiped main body.

An original cover 14 is coupled pivotally to the main body. The original cover 14 presses the original M put on the original table 11, and covers the original table 11 such that light except irradiated light of a light source 31 and an LED 41 never irradiate the original. An original mat 15 is colored in white and secured to the original cover 14. In this case, an open/close sensor (not shown) is provided to the original cover 14. When an operation to close the original cover 14 is started, a detect signal is output to a control portion 70 described later.

An original cover 14 is coupled pivotally to the main body. The original cover 14 presses the original M put on the original table 11, and covers the original table 11 such that lights except irradiated lights of a light source 31 and an LED 41 never irradiate the original. An original mat 15 is colored in white and secured to the original cover 14. In this case, an open/close sensor (not shown) is provided to the original cover 14. When an operation to close the original cover 14 is started, a detect signal is output to a control portion 70 described later.

A carriage 13 is installed into the main body in parallel with the plate surface 12 so as to allow reciprocating motion of the carriage. The carriage 13 contains a linear image sensor 20 and a first optical system 30, and is fitted slidably to a guiding shaft, or the like, which is positioned in parallel with the plate surface 12 of the original table 11. A longitudinal shaft of the guiding shaft extends in the Z direction in FIG. 1. The carriage 13 is pulled by a belt, for example, to carry the linear image sensor 20 and the first optical system 30 in the Z direction in FIG. 1. A standby position of the carriage 13 is set to a position from which an optical image on the main scanning line, which is positioned in vicinity of an edge portion of the original table 11, can be input into the linear image sensor 20. In the first embodiment, the standby position is set to a position from which the optical image that is positioned away from an origin Q on the main scanning line S, which is set in vicinity of the original guide 16 on the original table 11, by 10 mm in the sub scanning direction can be focused. In this case, if the optical image of the minimum size original, which is put on a predetermined reading position on the original table 11, on the main scanning line can be input into the linear image sensor 20 from the position, a distance to the standby position of the carriage 13 from the origin Q may be set to any distance.

The linear image sensor 20 is installed into the carriage 13 in such a fashion that a plurality of light receiving elements such as photo diodes, etc. are aligned linearly in the direction perpendicular to a surface of the sheet in FIG. 1. The linear image sensor 20 scans an optical image on the main scanning line, which is focused by the first optical system 30, and light, which is guided by a second optical system 40, respectively and then outputs electric signals that correspond to the optical image and the light. The linear image sensor 20 stores charges, which are obtained by photoelectric-converting the lights in predetermined wavelength ranges such as visible rays, infrared rays, ultraviolet rays, etc., for a constant time and then outputs the electric signals, which respond to a quantity of received light every light receiving element respectively, by using CCDs (Charge Coupled Devices), MOS transistor switches, etc. In this case, the linear image sensor 20 has the light receiving elements onto which the optical image on the main scanning line is focused by the first optical system 30 and spare light receiving elements which are arranged further on the outside of the above elements. Also, assume that the numbers used to identify uniquely the light receiving elements are affixed to all the light receiving element.

Figure 2:
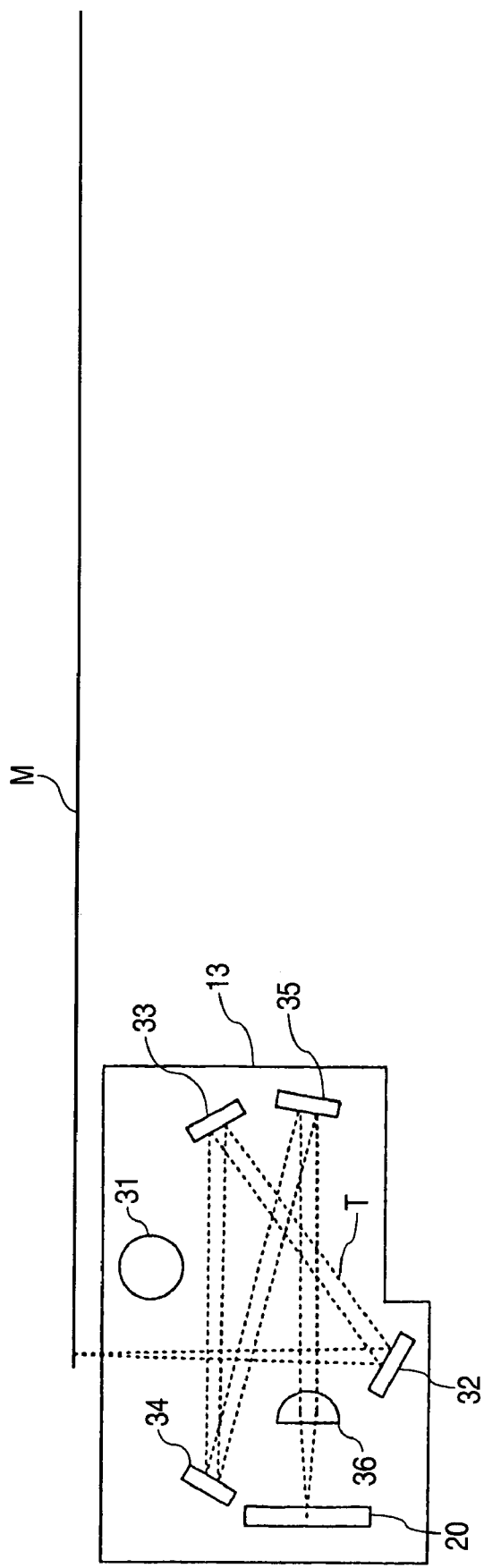
FIG. 2 is a schematic view showing optical paths that are formed by a first optical system in the image scanner according to the first embodiment of the present invention.

The first optical system 30 includes the light source 31, mirrors 32, 33, 34, 35, and a lens 36. The light source 31 is constituted by a tube illumination device such as a fluorescent tube lamp, or the like, and is installed into the carriage 13 in such a manner that a longitudinal axis of the light source 31 extends in parallel with a longitudinal axis of the linear image sensor 20. The mirrors 32, 33, 34, 35, and the lens 36 form an optical path T through which the optical image is input into the linear image sensor 20, as indicated by broken lines in FIG. 2.

The second optical system 40 includes mirrors 42, 43, 44 and an LED (Light Emitting Diode) 41 that is arranged directly under a length detecting position P as a detecting position set forth in claims to irradiate the length detecting position P. As indicated by broken lines in FIG. 1, the mirrors 42, 43, 44 form an optical path R through which light, which is emitted from the LED 41 when the original is present at the length detecting position P and then is reflected by the length detecting position P to input into the mirror 42, is guided to reach the linear image sensor 20 in the carriage 13 in its standby position via the mirror 35 and the lens 36 that are provided to the first optical system. In this case, the LED 41 and the mirror 42, 43 are arranged at the positions that do not interfere the movement of the carriage.

Figure 3:
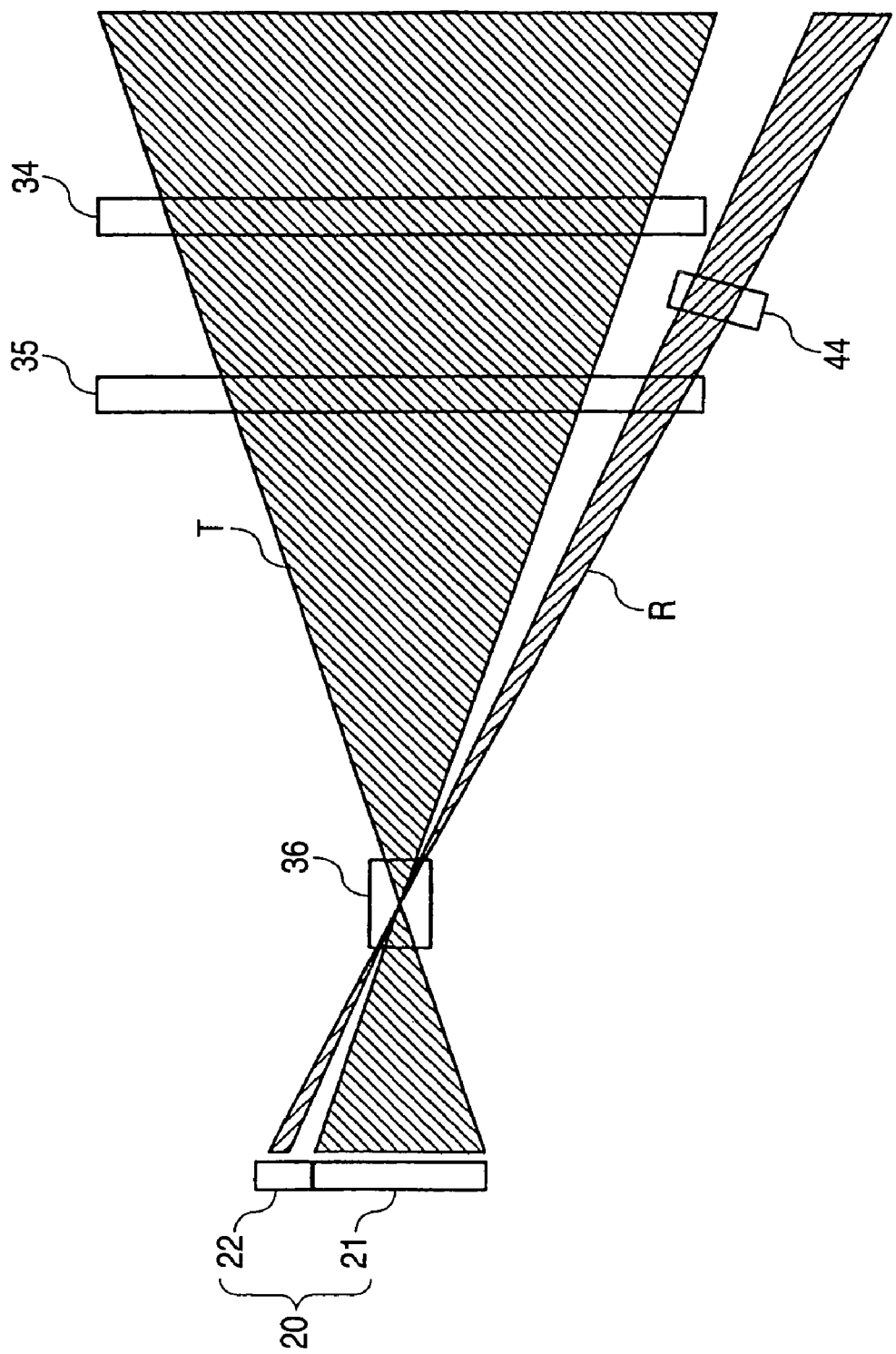
FIG. 3 is a view showing schematically the behavior that light reflected at a detecting position reaches a linear image sensor in the image scanner according to the first embodiment of the present invention.

FIG. 3 is a view showing schematic diagram that light, which is reflected by the mirror 44 in the second optical system 40, reaches the spare light receiving elements 22 in the linear image sensor 20. Reflected light at the length detecting position P is reflected by the mirror 44 in the second optical system 40 and then is input into the mirror 35 in the first optical system 30. The incident light is reflected by the mirror 35 and then comes up to the spare light receiving elements 22 in the linear image sensor 20 via the lens 36 in the first optical system 30, as shown in FIG. 3. In this case, the optical image on the main scanning line, which is input into the first optical system 30, is reflected by the mirror 34, then reflected by the mirror 35, and then is focused onto the light receiving elements 21 in the linear image sensor 20 via the lens 36.

As apparent from FIG. 3, the optical path R and the optical path T do not overlap with each other but intersect with each other on the optical axis of the lens 36. Therefore, main rays of the reflected light at the length detecting position P never coincide with main rays of the reflected light on the main scanning line. In other words is, a part of the first optical system via which the reflected light at the length detecting position P reaches the linear image sensor 20 are merely the mirror 35 and the lens 36, and thus the first optical system and the second optical system do not share the main rays.

In this case, explanation will be made in the following description under the assumption that the reflected light at the length detecting position P reaches the light receiving elements, which have the numbers 7495 to 7500, of the spare light receiving elements.

Figure 4:
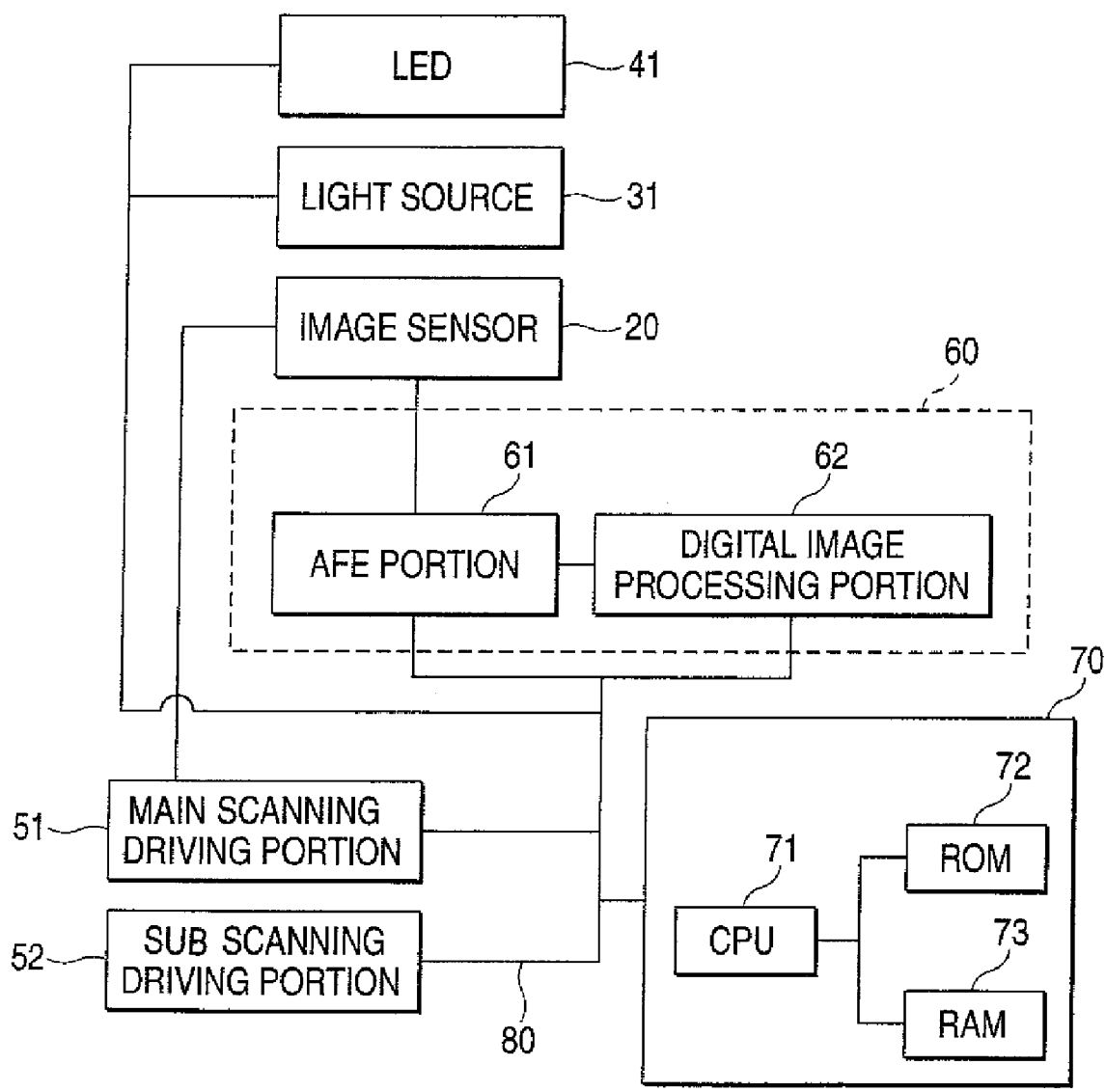
FIG. 4 is a block diagram showing an image scanner according to the first embodiment of the present invention.

FIG. 4 is a block diagram showing the image scanner 1.

A main scanning driving portion 51 is mounted onto a substrate that is fixed to the carriage 13. The main scanning driving portion 51 is a driving circuit that outputs a drive pulse, which is required to drive the linear image sensor 20, to the linear image sensor 20. The main scanning driving portion 51 is constructed by a synchronizing signal generator, a driving timing generator, etc., for example.

A sub scanning driving portion 52 is constructed by a belt retained by the carriage 13, a motor for rotating the belt and a gear train, a driving circuit, etc. and is installed in the main body. When the sub scanning driving portion 52 pulls the carriage 13 via the belt, the main scanning line that extends in the direction perpendicular to a sheet in FIG. 1 moves in the Z direction that is perpendicular to the above direction. Therefore, scanning of a two-dimensional image can be implemented.

A sub scanning unit set forth in the claim corresponds to the carriage 13 on which the linear image sensor 20 and the first optical system 30 are mounted, and the sub scanning driving portion 52 that moves the carriage 13 in the Z direction.

A signal processing portion 60 includes an AFE portion 61 and a digital image processing portion 62.

The AFE portion 61 is constituted by an analog signal processing portion, an A/D converter, etc. The analog signal processing portion applies analog signal processes such as amplifying process, noise reducing process, etc. to an output signal, which is output from the linear image sensor 20 in an analog representation, to output the resultant signal. The A/D converter quantizes the analog output signal, which is output from the analog signal processing portion, into an output signal, which has a predetermined bit_length in a digital representation, to output the resultant signal.

The digital image processing portion 62 applies the processes such as gamma correction, defective pixel interpolation executed by the pixel interpolation method, white balance correction, sharpening of the image signal, etc. to an output signal that is output from the AFE portion 61 to form image data. In this case, various processes that are applied by the digital image processing portion 62 may be replaced with the processes that are carried out in compliance with a computer program that is executed by a control portion 70.

The control portion 70 as a deciding unit in the claim includes a CPU 71, a ROM 72, and a RAM 73, and is connected to the main scanning driving portion 51, the signal processing portion 60, etc. via a bus 80. The CPU 71 executes the computer program stored in the ROM 72 to control respective portions of the image scanner 1. The CPU 71 decides the size and orientation of the original based on the electric signal, which is focused onto the linear image sensor 20 by the first optical system 30 and is converted, and the electric signal being obtained by converting the light, which arrives at the linear image sensor 20, by virtue of the second optical system 40. The ROM 72 stores the computer program executed by the CPU 71, a decision table used to decide the size of the original, various data, etc. The RAM 73 stores temporarily the program and various data.

With the above, a configuration of the image scanner 1 is explained.

FIG. 5 is a table showing the size and orientation of the original that can be read by the image scanner 1.

Figure 6:
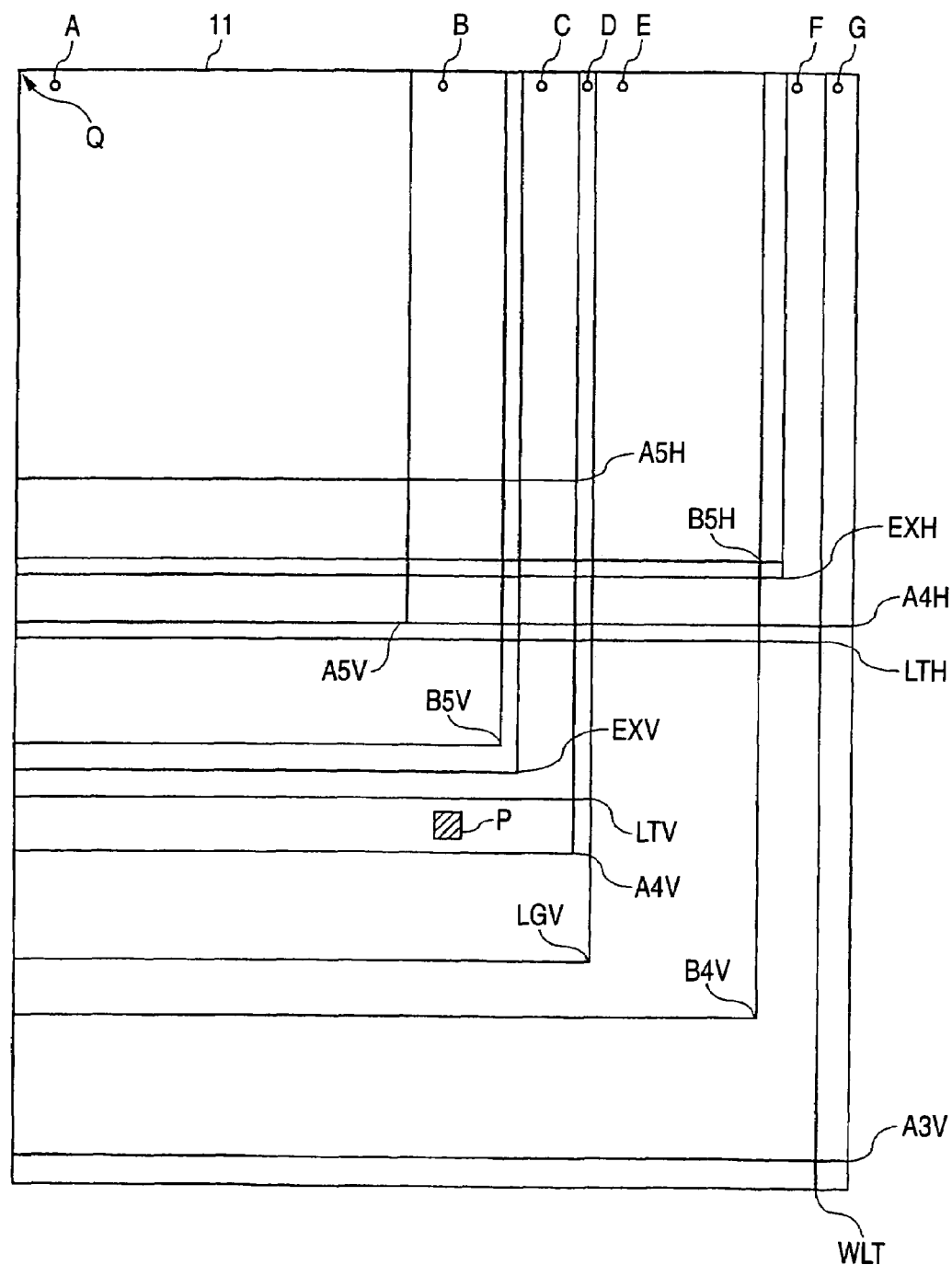
FIG. 6 is a plan view showing an original table provided to the image scanner according to the first embodiment of the present invention when viewed from the top.

FIG. 6 is a plan view showing the original table 11 when viewed from the top. In FIG. 6, frames A5H to WLT represent respective sizes of the original shown in FIG. 5. As shown in FIG. 6, the length detecting position P as the position at which the presence/absence of the original is detected is set to the position in the original having an A4 vertical size (A4V) that does not overlaps with the original having a letter vertical size (LTV), i.e., any position that is positioned in a range of 279.4 mm or more and 297 mm or less from the origin Q of the original table in the sub scanning direction and in a range of 0 mm or more and 210 mm or less from the origin Q in the main scanning direction. Width detecting positions A to G are the positions on the main scanning line, at which the length in the main scanning direction is detected when the carriage 13 is placed at the standby position. The width detecting positions A to G are set to any position that is away from the origin Q of the original table by 10 mm in the sub scanning direction and is positioned in any one of following ranges in the main scanning direction respectively.

0 mm<A<210 mm 148 mm<B<182 mm 184.2 mm<C<210 mm 210 mm<D<215.9 mm 215.9 mm<E<257 mm 266.7 mm<F<279.4 mm 279.4 mm<G<297 mm

In this case, a B5 vertical size (B5V) and an executive vertical size (EXV), and a B5 horizontal size (B5H) and an executive horizontal size (EXH) are set respectively such that only any one of them can be read according to the setting.

FIG. 7B is a decision table used to decide the size and orientation of the original. For example, if the original having an A4 vertical size is put on, the light receiving elements corresponding to the width detecting positions A to C become "signal present". Therefore, it is identified based on the decision table that the size of the original corresponds to either an A5 horizontal size or an A4 vertical size. In contrast, it is decided at the length detecting position P that the light receiving elements of the numbers 7495 to 7500, into which the light at the length detecting position P is input, of the spare light receiving elements 22 become "signal present". Therefore, it is identified that the size of the original is more than an A4 vertical size. As a result, only the A4 vertical size can be identified as the size that can satisfy both conditions simultaneously. Similarly, all sizes of other originals can be identified uniquely.

FIG. 7B is a decision table used to decide the size and orientation of the orientation. For example, if the original having an A4 vertical size is put on, the light receiving elements corresponding to the width detecting positions A to C become "signal present". Therefore, it is identified based on the decision table that the size of the original corresponds to either an A5 horizontal size or an A4 vertical size. In contrast, it is decided at the length detecting position P that the light receiving elements of the numbers 7495 to 7500, into which the light at the length detecting position P is input, of the spare light receiving elements 22 become "signal present". Therefore, it is identified that the size of the original is more than an A4 vertical size. As a result, only the A4 vertical size can be identified as the size that can satisfy both conditions simultaneously. Similarly, all sizes of other originals can be identified uniquely.

Figure 8:
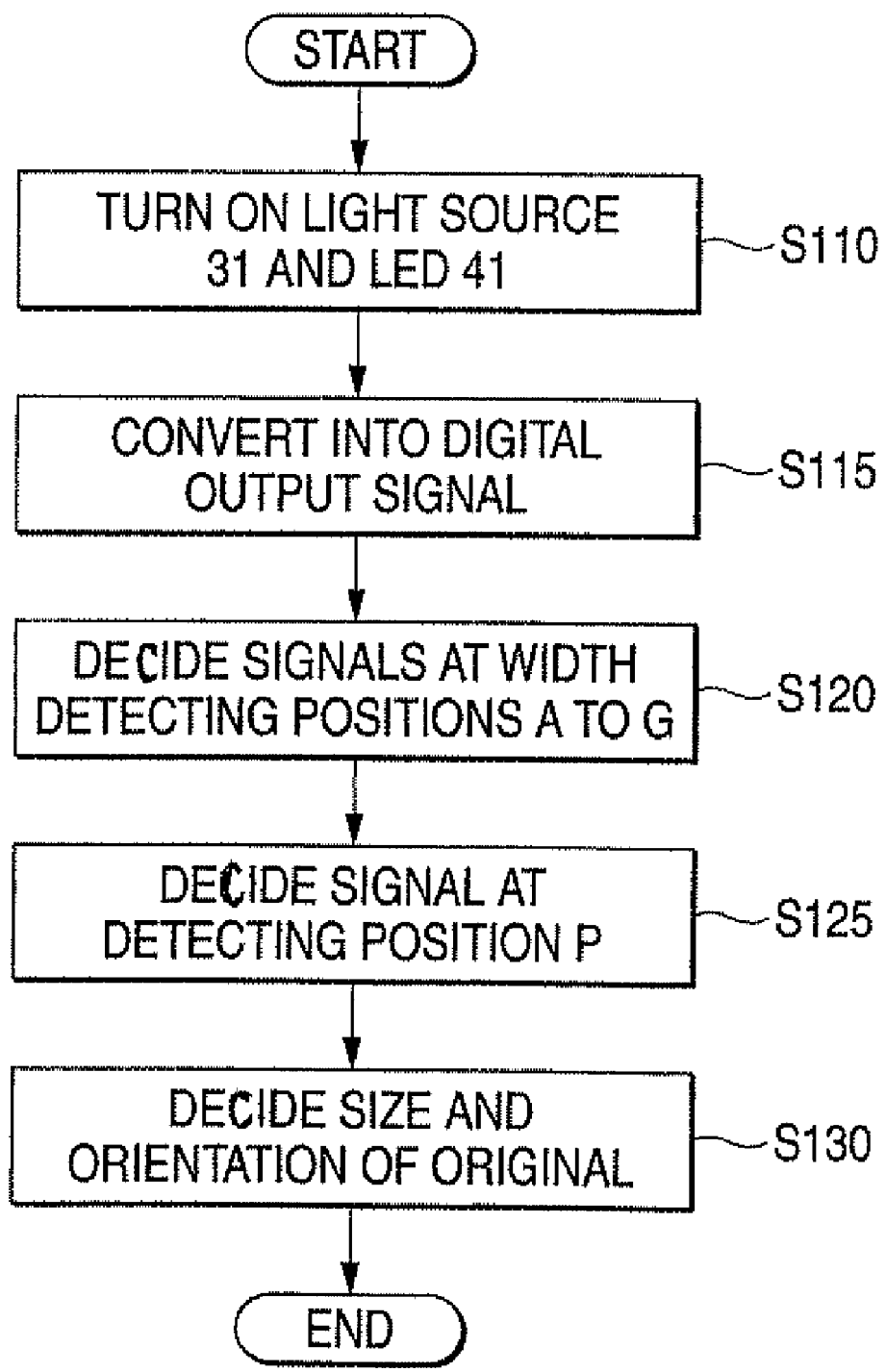
FIG. 8 is a flowchart showing a flow of processes by which the image scanner according to the first embodiment of the present invention detects the size and orientation of the original.

FIG. 8 is a flowchart showing a flow of processes by which the image scanner 1 detects the size and orientation of the original. These processes are started when the user closes the original cover 14 in the state that the carriage 13 is in the standby position. In this case, the process of detecting the size and orientation of the original is also started when the user pushes down an automatic reading start button (not shown) to indicate a start of the reading in the state that the original cover is still opened or when a start of the reading is indicated by the control device such as the personal computer, or the like connected to the image scanner in the state that the original cover is still opened, or before completely closed.

If the control portion 70 detects that an operation of closing the original cover 14 is started by an open/close sensor, it turns the light source 31 of the first optical system 30 and the LED 41 of the second optical system 40 ON (S110). After a predetermined time has lapsed, the linear image sensor 20 outputs the electric signals, which respond to the charges stored in respective light receiving elements, to the signal processing portion 60.

That is, the electric signals generated by converting the optical image on the main scanning line and the light being reflected at the length detecting position P, which are obtained immediately when the original cover 14 is being closed, are output.

The signal processing portion 60 applies a predetermined process to the output electric signals to convert such output electric signals into digital output signals and then outputs such signals to the control portion 70 (S115). The control portion 70 checks the output signals, which are converted from the electric signals being output from the light receiving elements corresponding to the width detecting positions A to G, out of the output signals that are output from the signal processing portion 60, and decides the presence/absence of the signals at the width detecting positions A to G respectively. More particularly, under the assumption that the output signal is represented by 1 byte, if values of three output signals out of five output signals, which are converted from the electric signals being output from five light receiving elements corresponding to the width detecting positions A to G respectively, are in a range of 32 or more and 255 or less successively, the signals at the concerned width detecting positions are decided as "signal present" (S120). Then, similarly it is decided whether or not three values of the output signals obtained by converting the reflected lights, which come from the second optical system 40, into the electric signals by five light receiving elements of the numbers 7495 to 7500 are in the range of 32 or more and 255 or less successively. For example, assume that the size of the loaded original is the A4 horizontal size.

In this case, since no original is present at the length detecting position P, the light emitted from the LED 41 is not reflected immediately before the original cover 14 is completely closed.

Hence, the light that reaches the spare light receiving elements 22 becomes the weak and dark light, and thus the value obtained when the light is converted into the digital output signal is below 32. Therefore, the length detecting position P is decided as "signal absence" (S125). The control portion 70 decides the size and orientation of the original in accordance with the decision table in FIG. 7(b) based on the presence/absence of the signals at the width detecting positions A to G and the presence/absence of the signal at the length detecting position P (S130). The size and orientation of the original are decided according to the above processes.

For example, if the image scanner 1 and the printer are connected to the control system such as the personal computer, or the like, such image scanner 1 reads the original based on the decided size and orientation of the original, and the digital image processing portion 62 forms the image data to output such data to the control system. The control system forms print data by applying the processes such as binarization, etc. to the image data to output to the printer, and also issues the instruction to print the print data on a paper whose size and orientation are decided by the image scanner 1.

Next, advantages of the first embodiment will be explained hereunder.

The image scanner 1 in the first embodiment causes the second optical system 40 to transmit the light, which is reflected at the length detecting position P, to the linear image sensor 20. That is, the light reflected at the length detecting position P goes to the linear image sensor 20 as the image sensor that is used to read the original. Therefore, a time required to move the carriage 13 in the sub scanning direction so as to receive the light, which is reflected at the length detecting position P, can be omitted, and also the provision of the dedicated sensor used to detect the presence/absence of the original at the length detecting position P can be omitted. As a result, the size and orientation of the original can be decided in a short time without provision of the dedicated sensor. Also, since the dedicated sensor is not provided, a production cost of the image scanner 1 can be reduced while deciding the size and orientation of the original in a short time.

When the image scanner 1 in the first embodiment detects the presence/absence of the signals on the main scanning line at the width detecting positions A to G and the length detecting position P in the standby position, such scanner causes the optical image on the main scanning line to input into the light receiving elements 21, which read the original, in the linear image sensor 20 and also causes the light, which is reflected at the length detecting position P, to input into the spare light receiving elements 22. Accordingly, conversion of the optical image on the main scanning line and conversion of the light reflected at the length detecting position P can be executed at the same time, and thus detecting of the size of the original can be executed in a shorter time. In addition, since normally the spare light receiving elements 22 are provided to the linear image sensor, the image scanner 1 in the first embodiment causes such spare light receiving elements 22 to convert the light reflected at the length detecting position P into the electric signals. As a result, the cost increase caused when the conversion of the light reflected at the length detecting position P into the electric signal is executed simultaneously by transmitting such light to the light receiving elements, which are different from the light receiving elements to which the optical image on the main scanning line is input, can be suppressed. Thus, a detecting time of the size and orientation of the original can be reduced much more without increase of the cost.

In this case, in the first embodiment, the LED 41 is provided to the second optical system to irradiate the length detecting position P. However, the light of the light source 31 may be irradiated by providing an optical path that guides the light of the light source 31, which is provided to the first optical system 30, onto the length detecting position P.

Further, in the first embodiment, the open/close sensor for detecting the open/close of the original cover 14 is provided, and then the process of detecting the size and orientation of the original is started when the close of the original cover 14 is detected. In this case, if the original mat 15 is colored in any color except a white color, such process may be started, for example, when the start button used to start the image reading is pushed after the original cover 14 is closed completely.

Second Embodiment

A configuration of an image scanner 2 as a second embodiment of an image reading system according to the present invention will be explained hereinafter. The image scanner 2 is the so-called moving mirror type image reading system in which only the optical system is installed into the carriage. In this case, explanation of the substantially same portions as those in the first embodiment will be omitted from the following description.

Figure 9A:
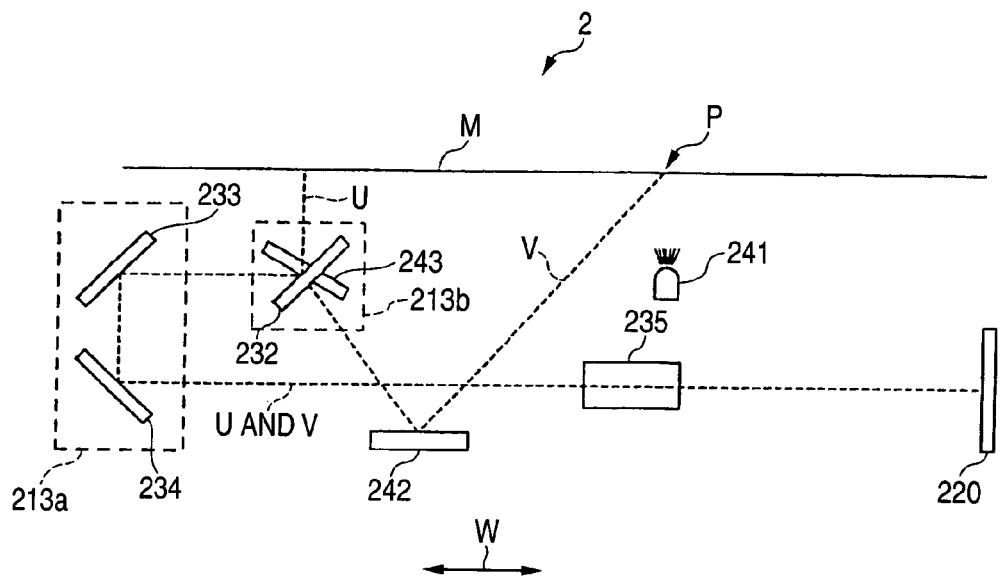
FIG. 9A is a schematic view showing an image scanner according to a second embodiment of the present invention.

FIG. 9A is a schematic view showing the image scanner 2. The image scanner 2 is the so-called flat bed type in which the original table is provided to an upper surface of the cuboid main body. In this case, M in FIG. 9A denotes the original that is loaded on the original table.

A carriage 213a and a carriage 213b are installed into the main body so as to allow the reciprocating motion in parallel with the plate surface of the original table. The carriage 213a includes a mirror 233 and a mirror 234 in the first optical system, and the carriage 213b includes a mirror 232 in the first optical system. The carriage 213a and the carriage 213b are fitted slidably to a guiding shaft, or the like, which is provided in parallel with the plate surface of the original table. A longitudinal axis of the guiding shaft extends in the W direction in FIG. 9A. The carriage 213a and the carriage 213b are pulled by the belt, for example, to carry the first optical system except a lens 235 in the W direction in FIG. 9A. At this time, the carriage 213a is carried in the W direction at a half speed of the carriage 213b such that an optical length of an optical path U, which is formed by the first optical system, can be kept constant. For example, if the carriage 213b is carried by a distance L, an optical length can be kept constant by setting a traveling distance of the carriage 213a to L/2 because the optical path U returns back at the mirror 233 and the mirror 234. A standby position of the carriage 213b may be set to any position that is remote from the origin being set on the original table by any distance if the carriage 213b can input the optical image of the minimum size original, which is put on the predetermined position on the original table, on the main scanning line into a linear image sensor 220. A standby position of the carriage 213a is set to a position that is remote from the standby position of the carriage 213b by a predetermined distance such that an optical length of the optical path U, which is formed by the first optical system, becomes a predetermined length.

The first optical system comprises a light source (not shown), the mirrors 232, 233, 234, and the lens 235. As indicated by broken lines in FIG. 9A, the mirrors 232, 233, 234, and the lens 235 constitute the optical path U that focuses the optical image on the main scanning line onto the linear image sensor 220.

The second optical system comprises an LED (Light Emitting Diode) 241, a mirror 242, and a mirror 243. The LED 241 and the mirrors 242, 243 are fixed in the main body not to interfere with the movement of the carriage 213a and the carriage 213b. When the carriage 213a and the carriage 213b are placed at their standby positions, as indicated by broken lines in FIG. 9A, the second optical system forms an optical path V that inputs the light, which is emitted from the LED 241, then reflected at the length detecting position P, and then input into the mirror 242, into the linear image sensor 220 via the mirror 233, the mirror 234, and the lens 235 which are provided to the first optical system. In this case, the optical path V is formed only when the carriage 213a and the carriage 213b are placed at their standby positions. Therefore, the mirror 243 may be placed at any position unless the carriage 213b is placed at its standby position. For example, the mirror 243 may be mounted onto the carriage 213b.

Figure 9B:
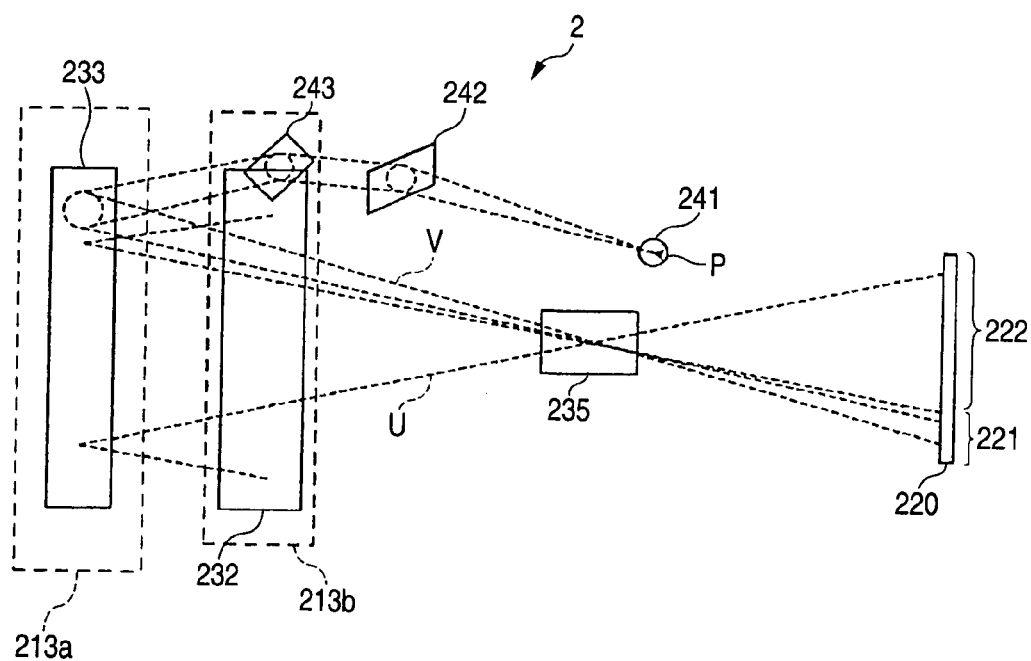
FIG. 9B is a view showing schematically a behavior that light reflected at a detecting position reaches the linear image sensor in the image scanner according to the second embodiment of the present invention.

FIG. 9B is a view showing a schematically diagram that the light reflected by the mirror 243 in the second optical system reaches the spare light receiving elements 221 in the linear image sensor 220. When the carriage 213a and the carriage 213b are placed at their standby positions, the light that is reflected at the length detecting position P is reflected by the mirrors 242 and 243 in the second optical system, and then input into the mirror 233 in the first optical system. The incident light is reflected by the mirror 233 and mirror 234 not shown in FIG. 9B, and then reaches the spare light receiving elements 221 in the linear image sensor 220 via the lens 235 in the first optical system. In this case, the optical image on the main scanning line, which is input into the first optical system, is reflected by the mirror 232, then reflected by the mirror 233 and mirror 234 not shown in FIG. 9B, and then input into light receiving elements 222 in the linear image sensor 220 via the lens 235.

As described above, the present invention can also be applied to the moving mirror type image reading system.

Third Embodiment

Figure 11:
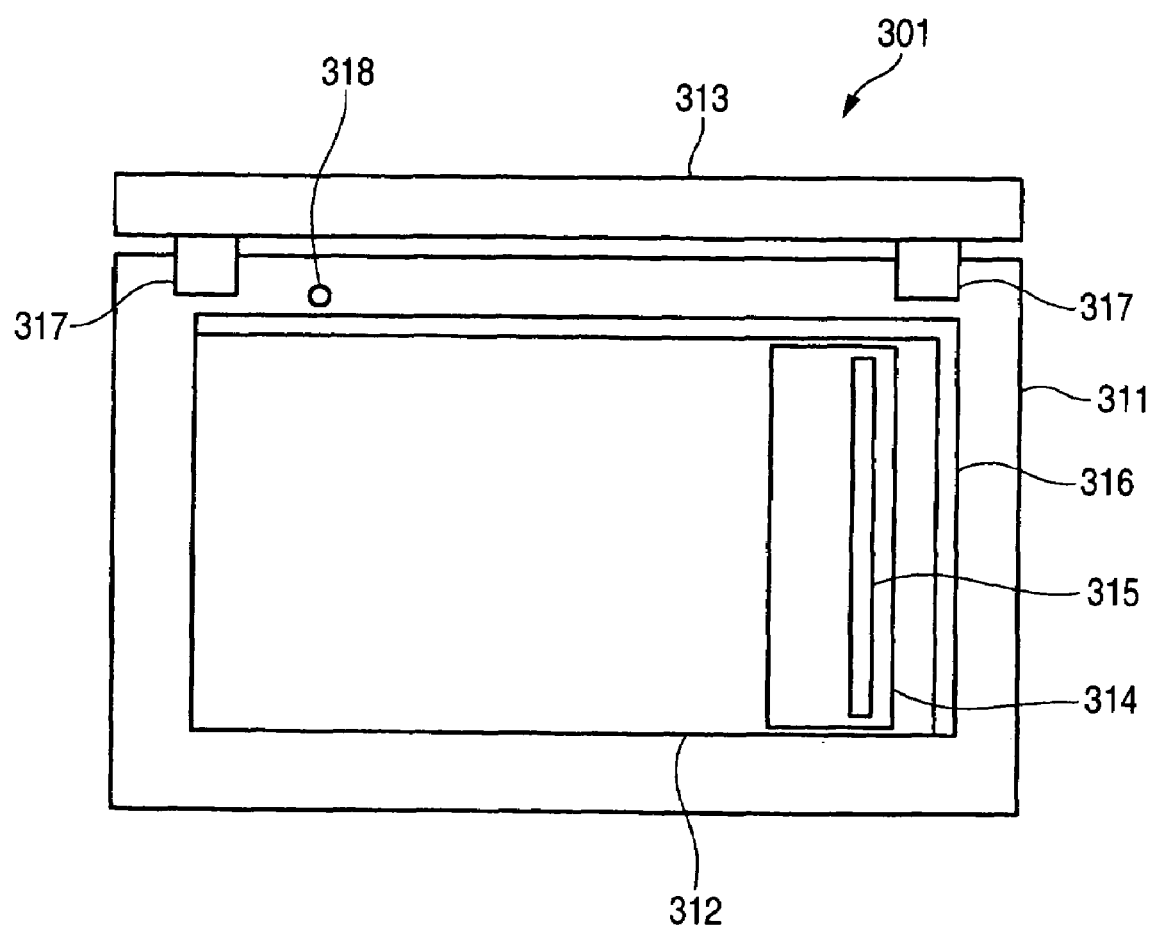
FIG. 11 is a top plan view of an image reading apparatus according to the embodiment of the invention.

FIG. 11 is a plan view of an image scanner 301 as an image reading apparatus according to a third embodiment of the invention. The image scanner 301 is of a so-called flat bed type having a substantially rectangular, transparent original table 312 formed with a glass plate on the surface of a rectangular parallelepiped body 311. An original such as a photograph, a document or the like is placed and held on the top of the original table 312. The document comes into contact with two sides of an L-shaped original guide 16 provided at the edge of the original table 312, whereby the document is positioned as designated on the surface of the original table 312. In case that the document paper is of decidable standard size, the document is positioned in a designated placing and holding range corresponding to the standard size. An original cover 313 is provided on the body 311 so as to be able to pivot from a posture where the surface of the original table 312 is opened (completely opened) by hinges 317 to a posture where the surface of the original table 312 is covered (completely covered) thereby. FIG. 11 shows the original cover 313 in a completely opened condition. The original cover 313 is used to hold down the document placed and held on the top of the original table 312 and to cover the original table 312 so that light other than the light emitted from a main lamp 322 (see FIG. 13) and LED 332 (see FIG. 13) does not irradiate the document. Further, the movable member 318 of a posture sensor 334 for detecting the posture of the original cover 313 is projected from the neighborhood of the pivotal axis of the original cover 313 of the body 311. Further, the original-holding-down side of the original cover 313 is preferably whitish to have light readily reflected therefrom.

Figure 12:
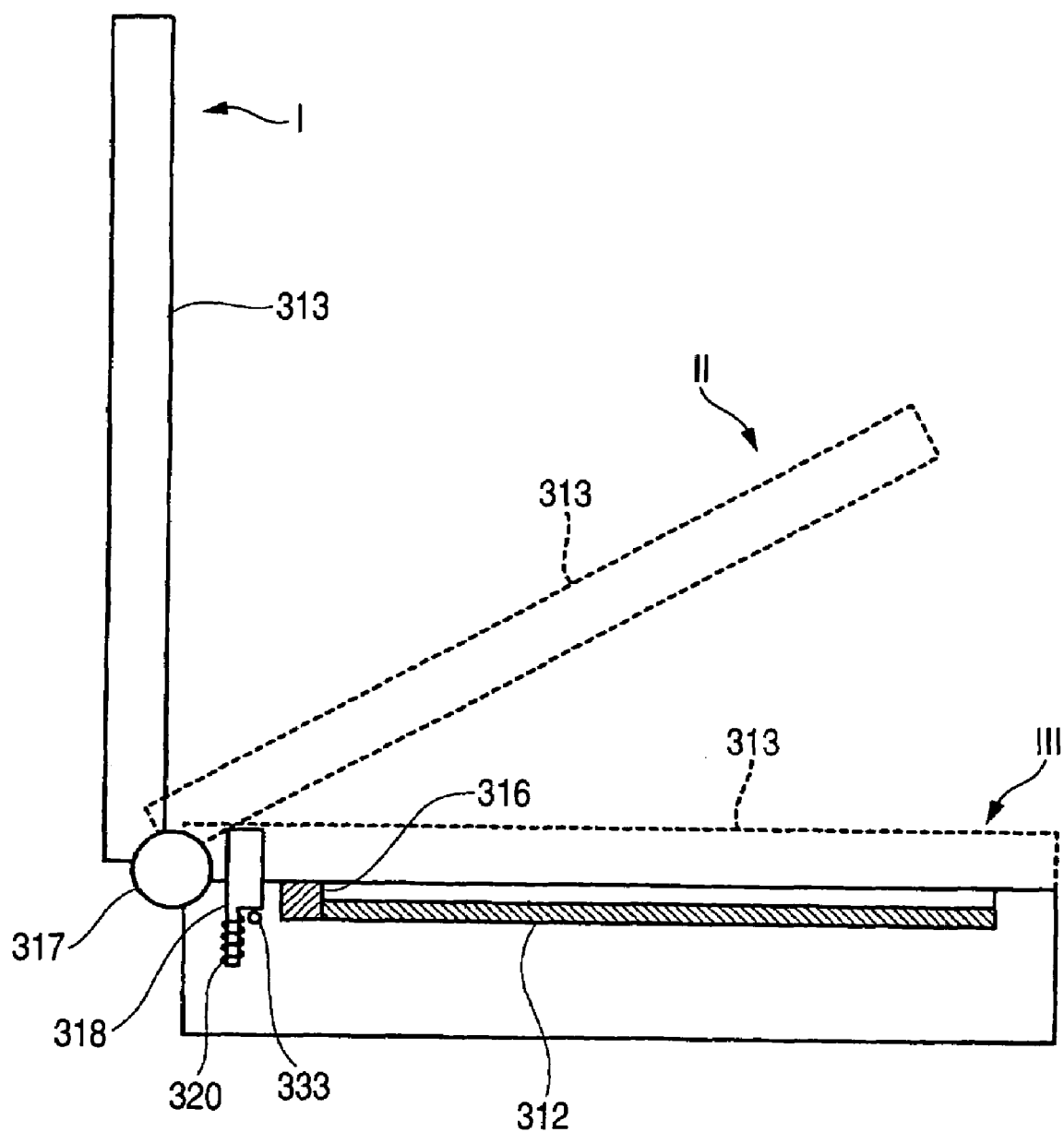
FIG. 12 is a schematic depiction according to the embodiment of the invention.

FIG. 12 is a schematic depiction of a change in the posture of the original cover 313. A posture I is equivalent to a full open position and a posture II is equivalent to an intermediate position during the time the original cover 313 is pivoting from the full open position to a full closed position. The movable member 318 of the posture sensor 334 is urged by a spring 320 in the direction of projecting from the surface of the body 311. When the original cover 313 is situated in the intermediate position, the movable member 318 comes into contact with the original cover 313 and when the original cover 313 approaches the full closed position further, the movable member 318 is pushed into the body 311.

Figure 13:
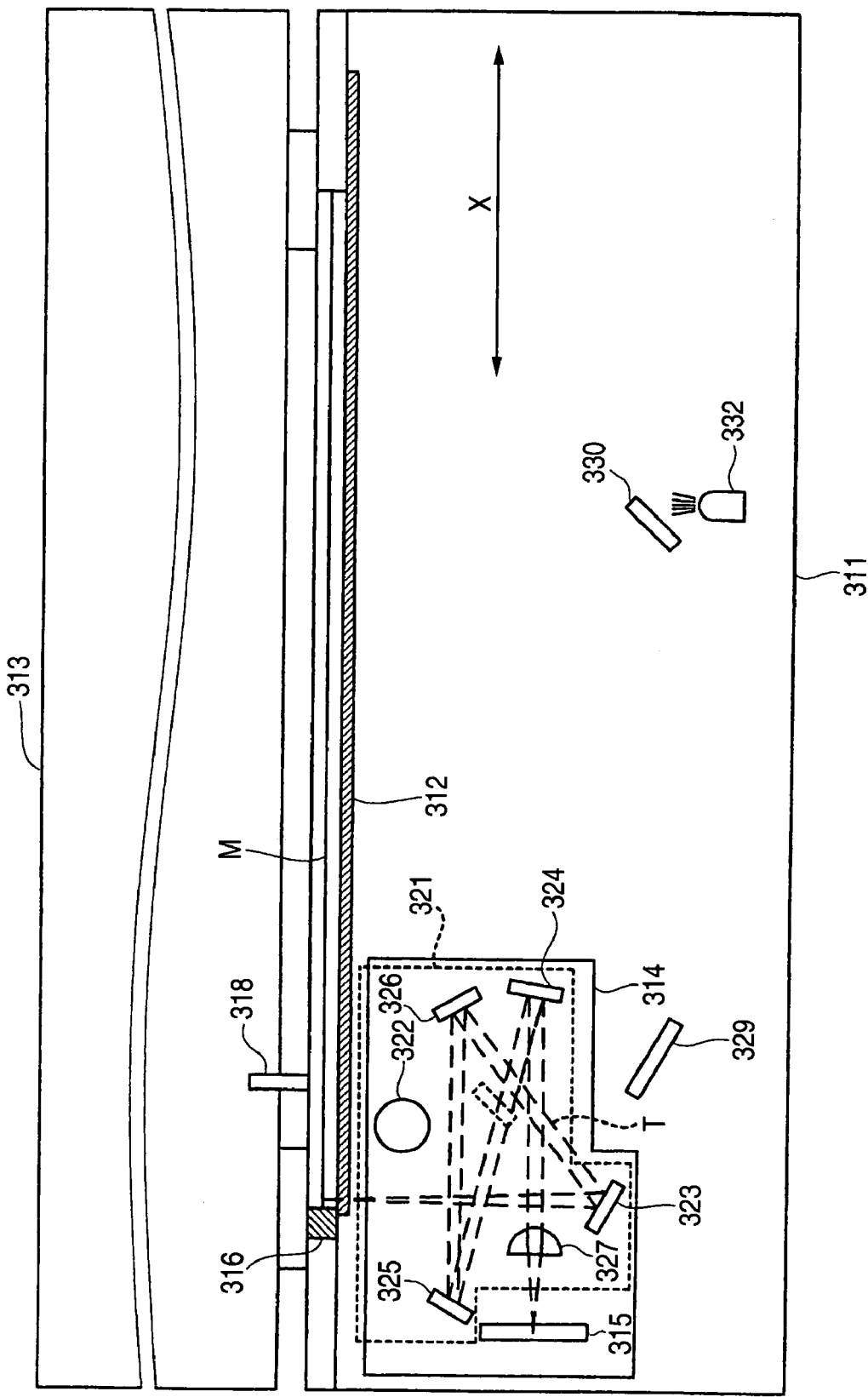
FIG. 13 is a schematic depiction according to the embodiment of the invention.
Figure 14:
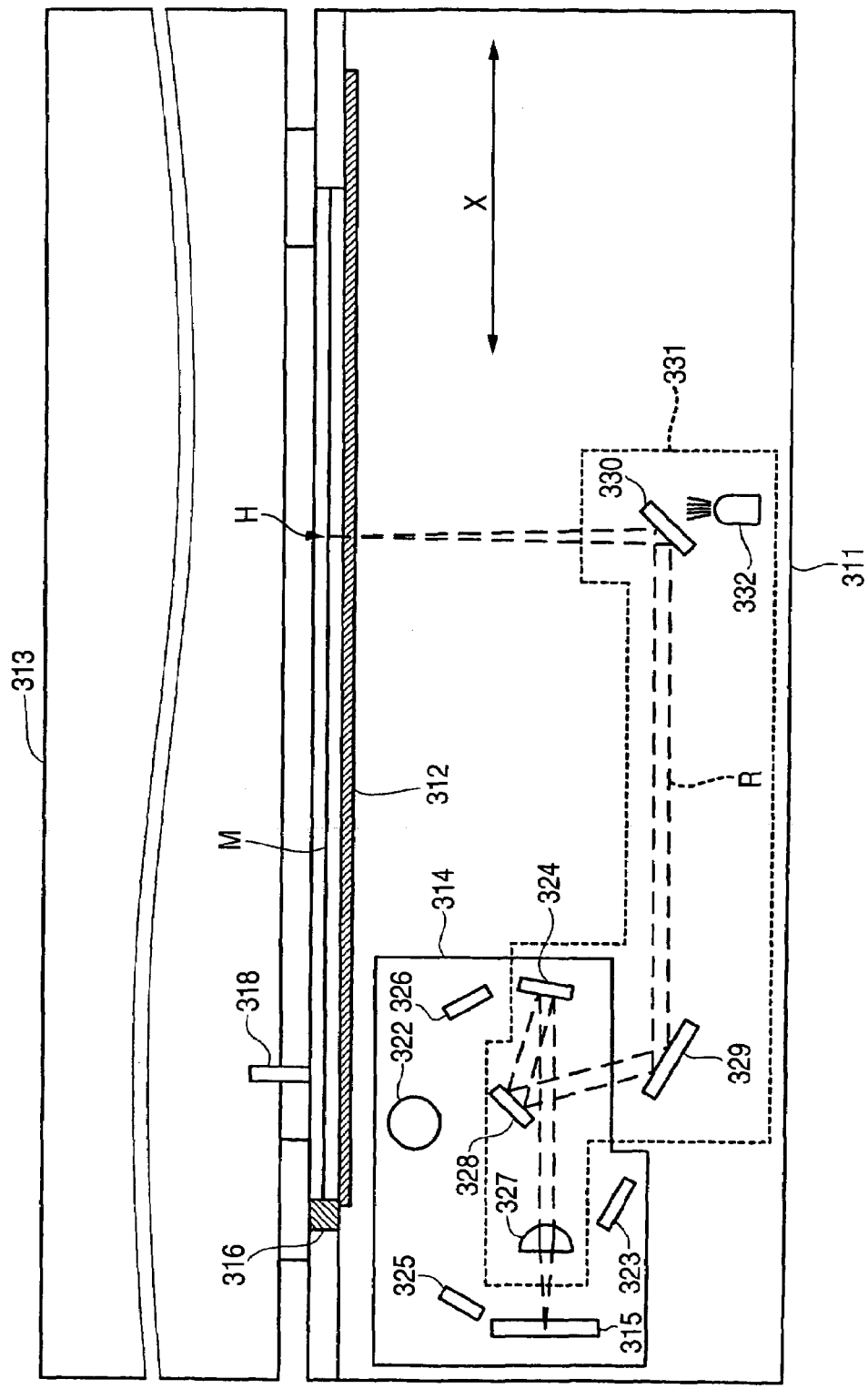
FIG. 14 is a schematic depiction according to the embodiment of the invention.

FIG. 13 and FIG. 14 are schematic depictions of the image scanner 301.

As shown in FIG. 13, a carriage 314 is housed in the body 311 such that it is movable back and forth in parallel to the surface of the original table 312. The carriage 314 is equipped with a linear image sensor 315, a first optical system 321 and a partial second optical system 331 (see FIG. 14) and is latched slidably to a guide shaft or the like set parallel to the original table 312. The axis in the longitudinal direction of the guide shaft is extended in the X direction (subscanning direction) of FIG. 313 and the carriage 314 is drawn by a belt, for example, so as to carry the linear image sensor 315, the first optical system 321 and the partial second optical system 331 in the subscanning direction. FIG. 13 shows the carriage 314 in a standby position. More specifically, the carriage 314 in the standby position is set in a position where it is capable of reading an area on a main scanning line passing detection positions A to G, which will be described later, on the original table 312.

The linear image sensor 315 reads a document M by subjecting the light reflected from the document M placed and held on the top of the original table 312 to photoelectric conversion. More specifically, the linear image sensor 315 has a plurality of pixels such as photodiodes linearly arranged in a direction perpendicular to the paper surface of FIG. 13, accumulates a charge obtainable by subjecting light such as visible light, infrared light and ultraviolet light in a designated wavelength area to photoelectric conversion for a certain time and outputs the charge accumulated in proportion to the quantity of light received by each pixel as voltage using a CCD (Charge Coupled Device), MOS transistor switches and so on. Further, the linear image sensor 315 may be a color image sensor provided with at least one line of light receiving parts apart from each other with the plurality of pixels for each channel of RGB, that is, three or more of lines in total.

The first optical system 321 has the main lamp 322, mirrors 323, 326, 325 and 324, and a lens 327. The main lamp 322 is formed with a tubular lighting apparatus such as a xenon lamp and mounted on the carriage 314 in such a posture that the axis in the longitudinal direction of the main lamp is extending in parallel to the axis in the longitudinal direction of the linear image sensor 315. The main lamp 322 operates to irradiate the back side of the original table 312 from the inside of the body 311. The mirrors 323, 326, 325 and 324 and the lens 327 form an optical path T led from an area on the surface of the original table 312, that is, the area on the main scanning line in parallel to the axis in the longitudinal direction of the linear image sensor 315 up to the linear image sensor 315 as shown by broken lines in FIG. 13.

As shown in FIG. 14, the second optical system 331 has an LED (Light Emitting Diode) 332, the mirror 324, a mirror 328, a mirror 329 and a mirror 330, and the lens 327. Further, the mirror 324 and the lens 327 are usable simultaneously for the first optical system 321 and the second optical system 331. The LED 332 is disposed in the detection position on the surface of the original table 312, that is, disposed under a detection position H apart from an edge side extending in the main scanning direction of the original guide 316 to the subscanning direction X and used to irradiate the detection position H from the back side of the original table 312. The detection position H is in an area set to decide the length of a document in the subscanning direction and the specific position will be described later. The mirrors 330, 329, 328 and 324 form an optical path led from the detection position H up to the linear image sensor 315 as shown by broken lines in FIG. 14. Incidentally, the LED 332 and the mirrors 330 and 329 are to be disposed in positions so that the movement of the carriage 314 is not impeded. The second optical system 331 is installed, whereby an area on the main scanning line close to the edge side extending in the main scanning direction of the original guide 316 and an area apart from the main scanning line in the subscanning line can simultaneously be read. Therefore, the installation of the second optical system 331 makes it possible to decide the length of the document in the subscanning direction without moving the carriage 314 from the standby position. Thus, it becomes possible to differentiate among various document sizes in a short time even when the direction of the document placed and held on the top of the original table 312 is variable.

Figure 15:
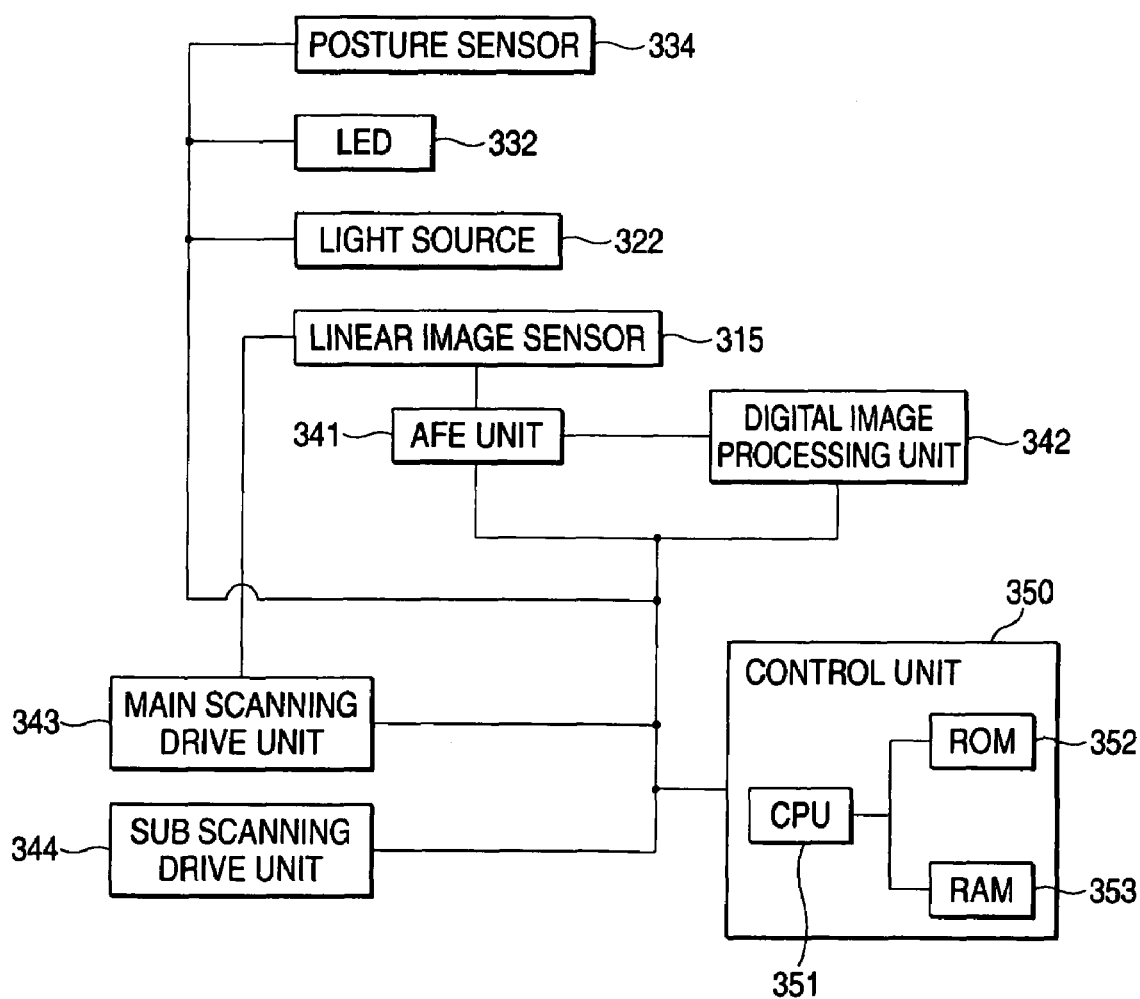
FIG. 15 is a block diagram according to the embodiment of the invention.

FIG. 15 is a block diagram showing the hardware configuration of the image scanner 301.

A main scanning drive unit 343 is loaded on a board fixed to the carriage 314. The main scanning drive unit 343 is a drive circuit for feeding a driving pulse necessary for driving the linear image sensor 315 into the linear image sensor 315. The main scanning drive unit 343 is formed with a synchronous signal generator and a driving timing generator, for example.

A subscanning drive unit 344 as a subscanning means is housed in the body 311 formed with a belt retained by the carriage 314, a motor and a gear train for rotating the belt, a drive circuit and soon. The scanning of a two-dimensional image can be carried out because the main scanning line extending in a direction perpendicular to the paper surface of FIG. 13 is moved in the subscanning direction perpendicular to the main scanning line when the subscanning drive unit 344 draws the carriage 314 with the belt.

An AFE unit 341 is formed with an analog signal processing portion, an A/D converter and soon. The analog signal processing portion subjects an electric signal outputted from the linear image sensor 315 or a photodiode 333 to amplification, noise reducing processing and the like and outputs the resultant signal. The A/D converter quantizes the output signal from the analog signal processing portion and then outputs an output signal in a digitized form having a designated bit length. Further, the output signal according to this embodiment of the invention is to have a 8-bit length, that is, the output signal is to be expressed with 256 gradations.

A digital image processing unit 342 prepares image data by performing processes including subjecting the signal outputted from the AFE unit 341 to shading compensation, gumma compensation, defective pixel interpolation by a pixel interpolation method, image signal sharpening and soon. Further, these processes are intended for the output signal when it is instructed to read the document M and need not be applied to the signal outputted for the detection of the document size, irrespective of whether the signal is from the linear image sensor 315 or the diode 333.

A control unit 350 has CPU 351, ROM 352 and RAM 353. The CPU 351 executes a computer program stored in the ROM 352 to control each part of the image scanner 301. The CPU 351 also functions as a means for deciding the document size by executing the computer program stored in the ROM 352. The ROM 352 is a memory for storing the computer program executed by the CPU 351, a decision table (see FIG. 22) for use in deciding the document size, various kinds of programs and data. These programs and various items of data may be fed in by down-loading from the server via a network or by reading from a readable storage medium such as a removable memory. The RAM is a memory for temporarily storing programs and data.

Figure 16A:
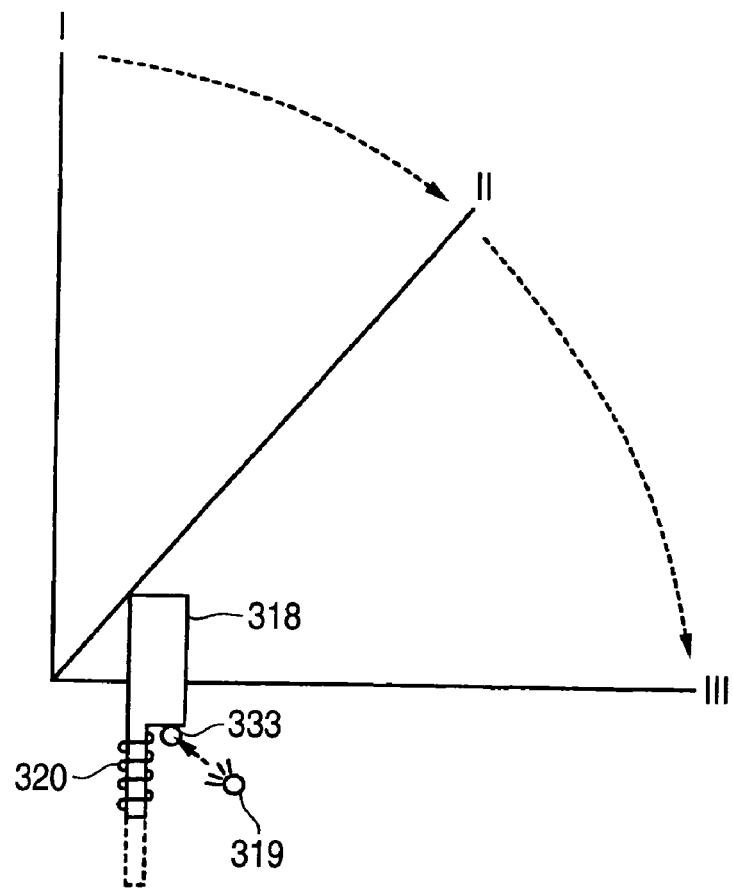
FIG. 16 is a schematic depiction according to the embodiment of the invention.
Figure 16B:
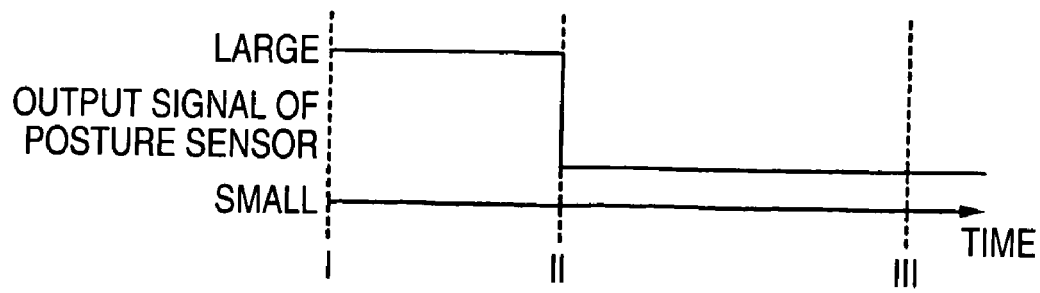

FIG. 16A is a schematic depiction of the posture sensor 34; and FIG. 16B, a waveform chart of the output signal of the posture sensor 334. The posture sensor 334 is a sensor for detecting the position of the original cover 313. The posture sensor 334 has the movable member 318, the spring 320 for urging the movable member 318 to project from the body 311, a posture detecting LED 319 and the photodiode 333 for detecting the light emitted from the posture detecting LED 319. Further, an optical path for causing the light emitted from the posture detecting LED 319 to reach the linear image sensor 315 is provided, so that the light emitted from the posture detecting LED 319 may be detected by the linear image sensor 315.

The movable member 318 does not come into contact with the original cover 313 during the time the original cover 313 is pivoting from the full open position I to the intermediation position II. During this period, the movable member 318 is urged by the spring 320, whereby it is positioned so as not to block the light emitted from the posture detecting LED 319. Therefore, the output signal of the photodiode 333 takes a high value during the time the original cover 313 is pivoting from the full open position I to the intermediate position II.

When the original cover 313 is in the intermediate position II, the movable member 318 comes into contact with the original cover 313 and when the original cover 313 pivots toward the full closed position further, the light emitted from the posture detecting LED 319 is blocked by the movable member 318 because the movable member 318 is pushed by the original cover 313 into the body 311. Consequently, the output signal of the photodiode 333 is made to vary at the timing of causing the original cover 313 to take the intermediate position II during the time the original cover 313 is pivoting from the full open position I to the full closed position. During the time the original cover 313 is pivoting from the intermediate position II to the full closed position III, detection light is block by the movable member 318, so that the output signal of the photodiode 333 takes a low value. Therefore, the timing of causing the original cover 313 to take the intermediate position II is detected when the output signal of the photodiode 333 is decided at designated time intervals.

A description will now be given of a position where a change in the quantity of light reflected from the document M or the original cover 313 is detected.

Figure 17:
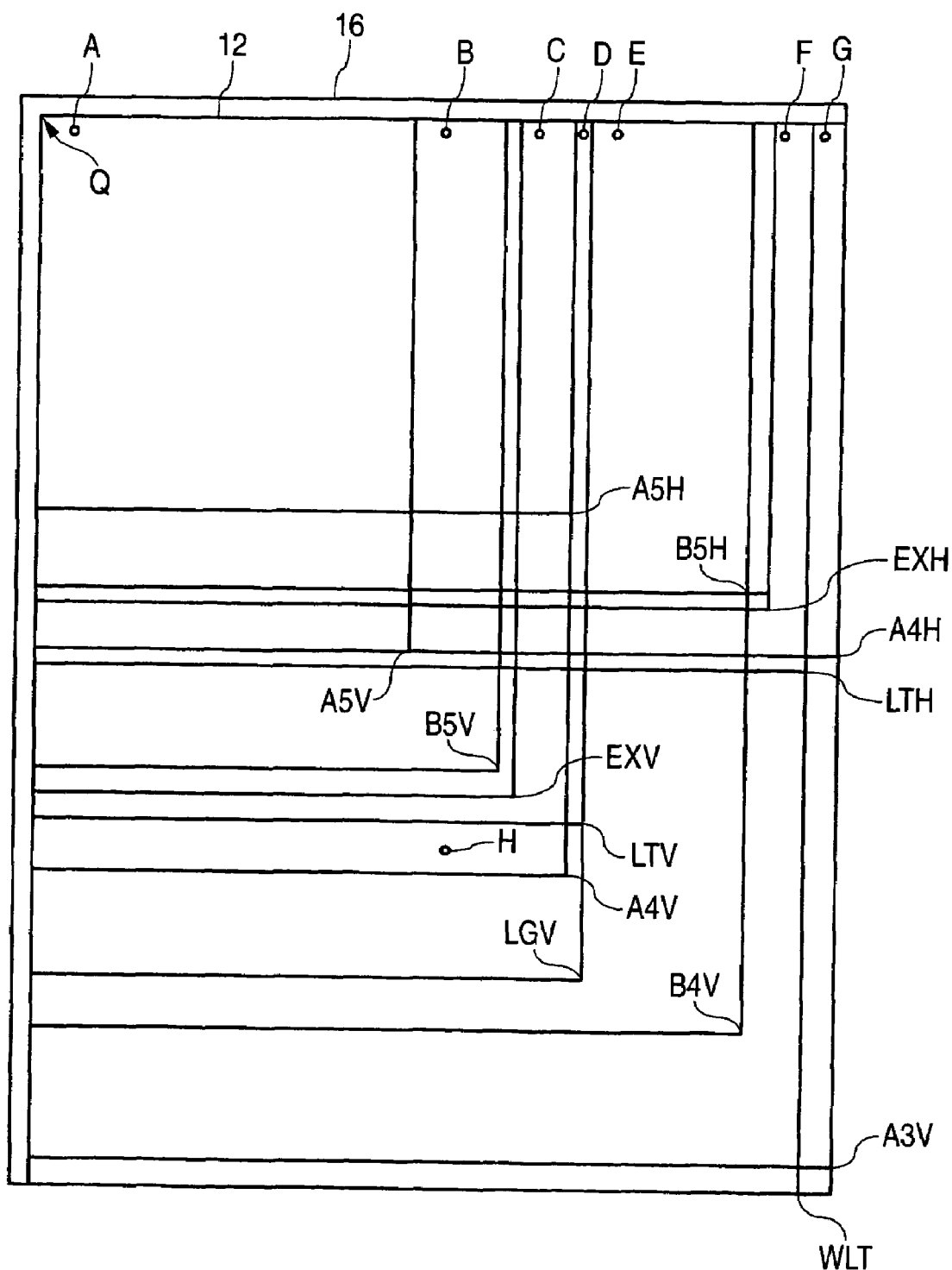
FIG. 17 is a plan view according to the embodiment of the invention.

FIG. 17 is a plan view of the original table 312. Frames A5H-WLT in FIG. 17 refer to a table showing a designated placing and holding range corresponding to the document size shown in FIG. 18. When the document size is detected, it is not necessary to detect a change in the quantity of light with respect to all pixels of the linear image sensor 15 but is necessary to detect a change in the quantity of light with respect to only the pixel on which reflected light is incident in a specific detection position on the original table 12. A change in the quantity of light with respect to only pixels on which light is incident from detection positions A to H shown in FIG. 17 is detected according to this embodiment of the invention.

The detection position H is in an area set to decide the length of a document in the subscanning direction. The detection position H is in the area covered with a document of A4 vertical (A4V) size on the original table 312 as shown in FIG. 17 and set in any position in the area not covered with a document of letter vertical (LTV) size. In other words, the detection position H is set at any position in an area 279.4 mm or greater but less than 297 mm apart from the origin Q in the subscanning direction and an area 0 mm or greater but less than 210 mm apart from the origin Q in the main scanning direction. The origin Q in this case is set right under the corner portion formed by two walls of the L-shaped original guide 316 in contact with the document. Further, in case where it is unnecessary to decide the length of the document in the subscanning direction because the whole document size can be decided only by the length thereof in the main scanning direction, detection of a change in the quantity of light with respect to a pixel corresponding to the detection position H can be dispensed with; this is also the case with the second optical system 331.

The detection positions A to G are set so as to line up linearly in the main scanning direction in a position slightly apart from the origin Q in the subscanning direction. A plurality of ranges as shown below are those specified by the lengths of a plurality of document sizes in the main scanning direction as shown in FIG. 18. When the detection positions are set in such a range as shown below, each of the detection positions is set between a pair of positions out of the plurality of positions specified by the lengths in the main scanning direction as shown in FIG. 17. However, with respect to B5 vertical size (B5V) and executive vertical (EXV) size, and B5 horizontal (B5H) and executive horizontal (EXH) size according to this embodiment of the invention, only size on one of the respective sides above can be set readable. Therefore, it is unnecessary to differentiate between the B5 vertical size (B5V) and the executive vertical (EXV) size according to this embodiment of the invention, so that no detection position is set between 182 mm and 184.15 mm and between 257 mm and 266.7 mm likewise.

$0\ mm < A < 148\ mm$ $148\ mm < B < 182\ mm$ $184.15\ mm < C < 210\ mm$ $210\ mm < D < 215.9\ mm$ $215.9\ mm < E < 257\ mm$ $266.7\ mm < F < 279.4\ mm$ $279.4\ mm < G < 297\ mm$

The designated pixels of the linear image sensor 315 described in claims of the invention are equivalent to pixels on which light is incident from detection positions A to G via the first optical system 321. A plurality of continuous pixels, for example, 320 pixels in the main scanning direction correspond to the respective detection positions in the linear image sensor 315.

The configuration of the image scanner 1 has been described until now, whereupon the operation of the image scanner 301 will now be described below.

To start with, the principle of detection of the document size will be described.

FIG. 10 is a graph of output signals of pixels of one line, plotted at the timing of causing the original cover 313 to take the full closed position and at the timing of causing the original cover 313 to take the intermediation position without any document loaded on the original table 312. When the original cover 313 is in the full closed position, the light emitted from the main lamp 322 is reflected from the original cover 313 and incident into the body 311 from the original table 312. When the original cover 313 is in the intermediate position, on the other hand, the quantity of reflected light of the main lamp 322, incident on the linear image sensor 315 from the original table 312 decreases in comparison with the case of the full closed position with respect of all pixels because of the diffusion of light. In the intermediate position, moreover, most of the light reflected from any position on the original cover 313 and a position close to the pivotal axis is incident on the linear image sensor 315, whereas most of the light reflected from a position remote from the pivotal axis is not incident on the linear image sensor 315. Therefore, pixels remoter from the pivotal axis of the original cover 313 have a greater decrease width in the quantity of received light. As the luminance of the main lamp 322 increases toward the vicinity of the center of the main lamp in the longitudinal direction and as the luminance of the main lamp decreases toward both the end portions, the quantity of received light becomes greatest in pixels situated closer to the pivotal axis from the center thereof.

When an area on the surface is covered with a document, each pixel of the linear image sensor 315 on which light is incident from the area covered with the document always receives light reflected from the document M irradiated by the main lamp 322, irrespective of whether the original cover 313 is in the full closed position or the intermediate position. The quantity of light received by the pixel in receipt of the light reflected from the document M is substantially constant because the light reflected from the document M irradiated by the main lamp 322 remains substantially unchanged even when the original cover 313 is in the full closed position or the intermediate position.

Consequently, the difference between the output signal with the timing of causing the original cover 313 to take the full closed position or with the timing immediately before then and the output signal with the timing of causing the original cover 313 to take the intermediate position II is such that the pixel corresponding to the area covered with the document becomes smaller, whereas the pixel corresponding to the area without being covered therewith becomes greater.

Therefore, a designated threshold Y is set to a variation width of the output signal with the timing of causing the original cover 313 to take the full closed position or with the timing immediately before then and the output signal with the timing of causing the original cover 313 to take the intermediate position, so that when the variation width of the output signal corresponding to a certain pixel is smaller than the threshold Y, the area corresponding to the pixel above can be decided as being covered with the document. In other words, by judging the size of the variation width of the quantity of light received by any given pixel when the original cover 13 pivots from the full open position to the full closed position, it can be decided whether the area on the surface of the original table 312 corresponding to the given pixel above is covered with the document. In this decision method, it can be decided whether the area on the surface of the original table 312 corresponding to the given pixel above is covered with the document without taking into consideration the variation width of the quantity of light received by any pixel other than the given pixel above.

A description will be given of the process of deciding the document size performed by the image scanner 301 next. The process of deciding the document size includes detecting a change in the quantity of light and deciding the size of the document M loaded on the surface of the original table 312.

Figure 19:
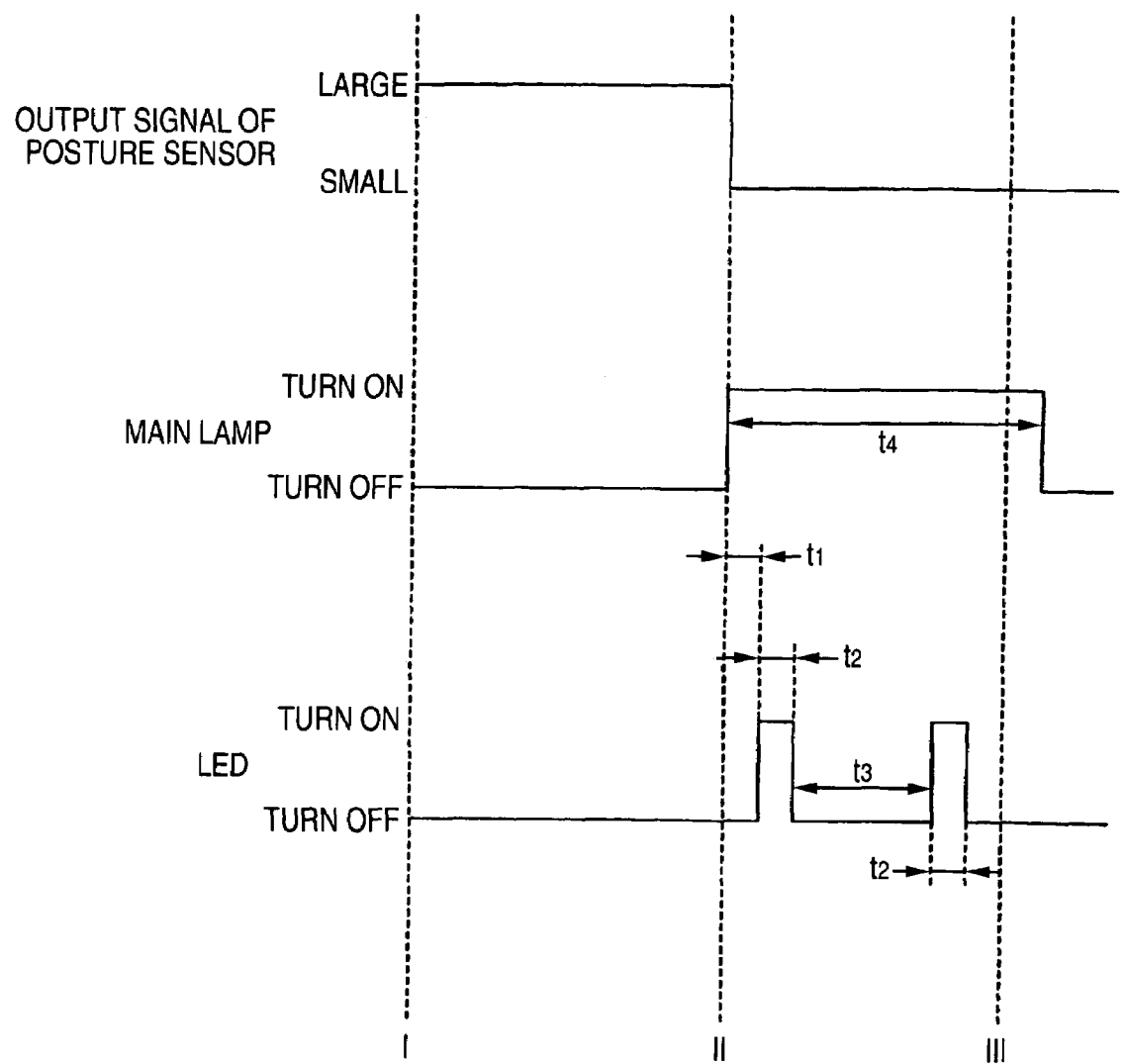
FIG. 19 is a time chart according to the embodiment of the invention.
Figure 20:
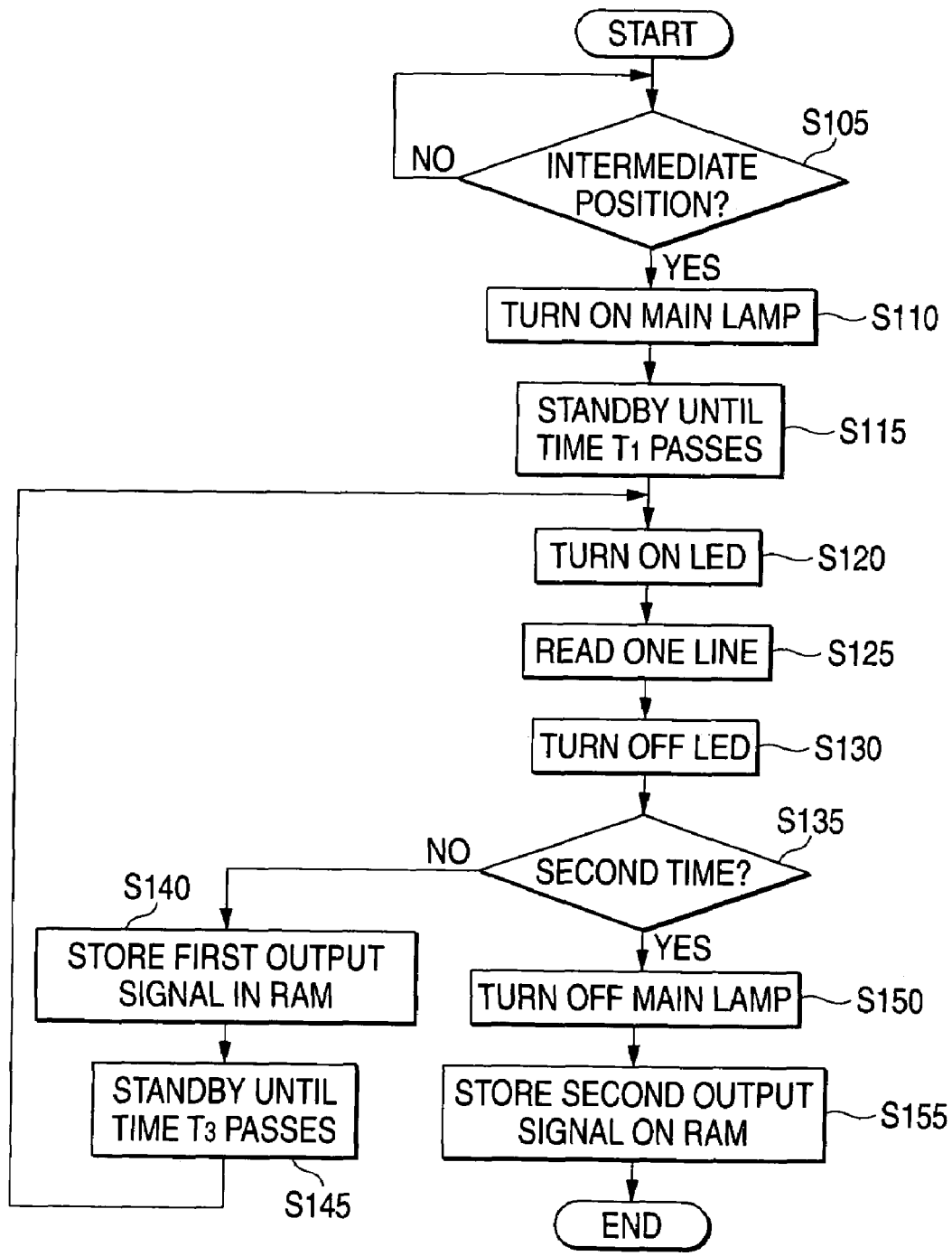
FIG. 20 is a flowchart according to the embodiment of the invention.

FIG. 20 is a flowchart showing a flow of detecting a change in the quantity of light; and FIG. 19 is a time chart illustrating the timing of detecting a change in the quantity of light. Incidentally, the carriage 314 is oriented in the standby position during the processing.

At S105, the output signal of the photodiode 333 given at designated intervals is monitored so that the timing of causing the original cover 313 to take the intermediate position is detected. More specifically, the control unit 350 decides that the original cover 313 is in the intermediate position when the output signal of the photodiode 333 changes to low after the original cover 313 in the full open position pivots to take the intermediate position. Unless the output signal changes to low, the control unit 350 repeats again the process of deciding the output signal predetermined time after.

At S110, the main lamp 322 is turned on.

At S115, a standby condition is retained until time t1 elapses after the main lamp 322 is turned on. The time t1 is about 310 seconds, for example, in the case of a xenon lamp for use as the main lamp 322.

At S120, the LED 332 is turned on. The main lamp 322 is turned on with timing faster than the timing of turning on the LED 332 because the main lamp 322 takes a longer time than the LED 332 until it emits light offering maximum luminance with stability.

At S125, a charge is accumulated in the linear image sensor 315 for the duration of t2 and the accumulated charge is detected in order to read one line passing through the areas A to G. At this time, the area movable member 318 together with the areas A-G are read as light of the area H is incident on the end portion of the linear image sensor 315 via the second optical system 331.

At S130, the LED 332 is turned off once so as to prevent deterioration.

At S135, a read number is decided and if it is the first reading, S140 is followed. If it is the second reading, S150 is followed.

At S140, the first signal outputted from the linear image sensor 315 is stored in the RAM 353. More specifically, the mean value in each of the detection positions A to H, for example, or the mean value of output signals for 320 pixels corresponding to one detection position, for example, is stored in the RAM 353. The mean value of output signals of a plurality of pixels is handled as the output signal corresponding to the detection positions A to H whereby to decrease a probability of incorrect decision resulting from slippage of the document as the original cover 313 is caused to pivot. When the mean value of the output signals of the plurality of pixels corresponding to one detection position is stored in the RAM 353, for example, pixels in a population may be selected so that one detection position has an expanse in the subscanning direction. The mean of pixels corresponding to two points not less than 30 fm apart from each other in the subscanning direction on the surface of the original table 312 may be stored in the RAM 353 as the output signal of the pixel corresponding to one detection position. Moreover, pixels in a population may be selected so that one detection position has an expanse in the main scanning direction and the subscanning direction both.

At S145, the standby condition is retained until time t3 elapses after the LED 332 is turned off. The time t3 is presumed to be the time required for the user to pivot the original cover 313 from the intermediate position to the full closed position and about 1,000 milliseconds in the concrete.

At S150, the main lamp 322 is turned off. Light having the same luminance looks dazzling for human eyes when the lamp is made to flash for an instant in comparison with a case where it is kept lighting for long. In case that the lamp is lighted for about 200 milliseconds or longer, it looks less dazzling. Therefore, it is preferred that the lighting time t4 of the main lamp 322 is at least 200 milliseconds or longer. Further, the main lamp 322 may be turned off once like the LED 332 after the first reading.

At S155, the second output signal is stored in the RAM 353. More specifically, the mean value of the output signals is stored in the RAM 353 using the same processing method as that at S140.

Figure 21:
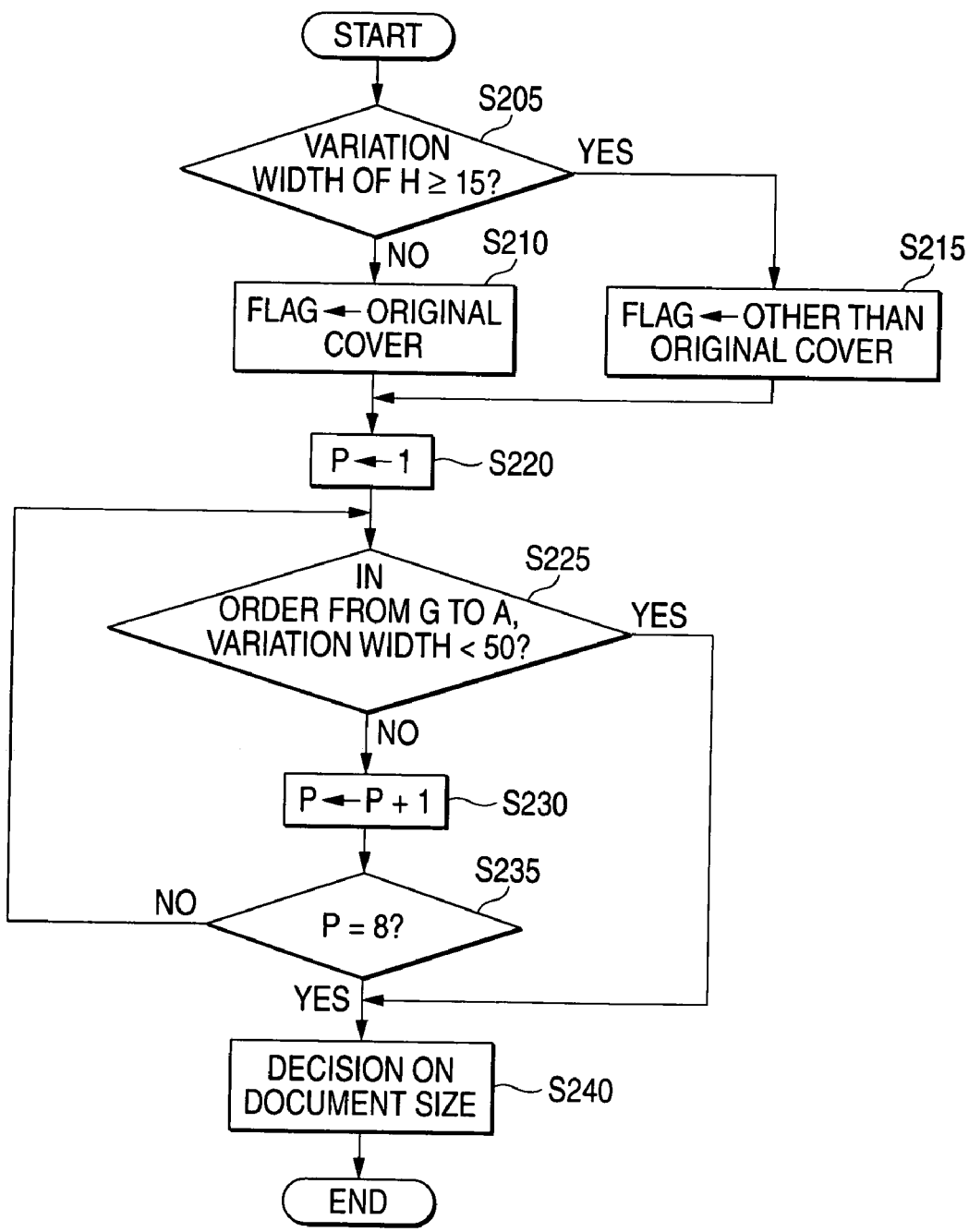
FIG. 21 is a flowchart according to the embodiment of the invention.

FIG. 21 is a flowchart showing the process of deciding the size of the document loaded on the surface of the original table 312 in the form of a flow according to the third embodiment of the invention. In the following description, it is decided that there is a significant difference provided the variation width is 315 or greater with respect to the detection position H.

At S205, a decision is made on whether the variation width of the output signal of the LED 332, that is, the variation width of the first output signal and the second output signal of the pixel corresponding to the detection position H has a value not less than the designated. When the variation width has the value not less than the designated, the detection position H is decided as being directly covered with the original cover 313 and S210 is followed then. When the variation width has a value less than the designated, the detection position H is decided as being directly covered with anything other than the original cover 313 and S215 is followed then. The designated value as a threshold is set to 15, for example.

At S210, a value indicative of the "original cover" is set to a flag for storing whether the detection position H is covered with the original cover 313 or the document.

At S215, a value indicative of "any cover other than the original cover" is set to the flag.

At S220, 1 is set to a variable P indicative of a number assigned to the detection position. Numbers 1 to 7 are assigned to the intermediate positions A to G as values of P corresponding to G to H in order.

At S225, a decision is made on whether the variation width of the first output signal and the second output signal of the pixel corresponding to the detection position to which the number set to the variable P is assigned has a value not less than the designated. When the variation width has a value not less than the designated, the detection position to which the number set to the variable P is assigned is decided as being directly covered with the original cover 313 and S230 is followed then. When the variation width has a value less than the designated, the detection position is decided as being directly covered with anything other than the original cover 313 and S240 is followed then. The designated value as a threshold is set to 350, for example.

At S230, 1 is added to the variable P.

At S235, a decision is made on whether the value of the variable P is 8 and when it is not 8, S225 is followed again and processing is repeated until the value of the variable P comes to 8. S240 is followed then when 8 is attained. In other words, a decision is made on whether each of the plurality of detection positions is directly covered with the original cover 313 in the order from the edge portion of the surface of the original table toward the designated placing and holding range corresponding to paper of minimal size. Then the decision process with respect of the remaining detection positions is omitted at a point of time any detection position is decided as being directly covered with anything other than the original cover 13. Consequently, the time required to the process of deciding the document size can be shortened. Further, though the decision has been made sequentially on whether the variation width of the first output signal and the second output signal of the pixel corresponding to each of the detection positions ranging from the detection position G to the detection position A during the repeated processing above, the decision may thus be made in reverse order starting with the detection position A.

At S240, the document size is decided. More specifically, such a decision is made on the basis of a decision table of FIG. 22. "O" in FIG. 22 shows that the relevant area is directly covered with anything other than the original cover, whereas "X" means that it is directly covered with the original cover. In case that a document of A4 vertical (A4V) size is placed and held on the top of the original table, the detection positions A to C and H are directly covered with the document, whereas the detection positions D to G are directly covered with the original cover. Therefore, the flag of the detection position H is a "document" and with 5 corresponding to the detection position C set to the variable P, the document size can be decided to be A4 vertical size. Similarly, all of the other document sizes can uniformly be specified.

As set forth above, the image scanner 301 according to the third embodiment of the invention makes it decidable whether the area corresponding to the pixel on the surface of the original table 312 is directly covered with the original cover 313 without taking into consideration the variation width of the quantity of light received by any pixel other than the pixel. In other words, with the image scanner 301 as described by reference to the flowchart of FIG. 21, a decision is sequentially made on the variation width of the detection position from the detection position G by using the image scanner 301 and it is unnecessary to decide any detection position after the detection position without being directly covered with the original cover is found. Therefore, correct document size can be decided without always inspecting all of the plurality of detection positions. Thus, a decision can surely be made on the document size in a short time.

With the image scanner 301, the document size can be decided without a sensor whose output signal changes with the timing of covering the surface of the original table 312. Therefore, it is unnecessary to install a sensor for varying the output signal with the timing of covering the surface of the original table 312, so that the sensor for detecting the position of the original cover 313 can be simplified in construction.

Further, though second optical system 331 for deciding length in the subscanning direction is installed according to this embodiment of the invention, the second optical system 331 can be dispensed with in case that only the document having constant length in the subscanning direction is read. Moreover, the linear image sensor 315 may be arranged so as to receive the light reflected from the detection position H by conveying the carriage 314 in the subscanning direction and the second optical system 331 can also be dispensed with in that case. In addition, an image sensor may separately be provided right under the detection position H, so that the variation width of the detection position H is decided on the basis of the output of the image sensor thus separately provided.

Figure 23A:
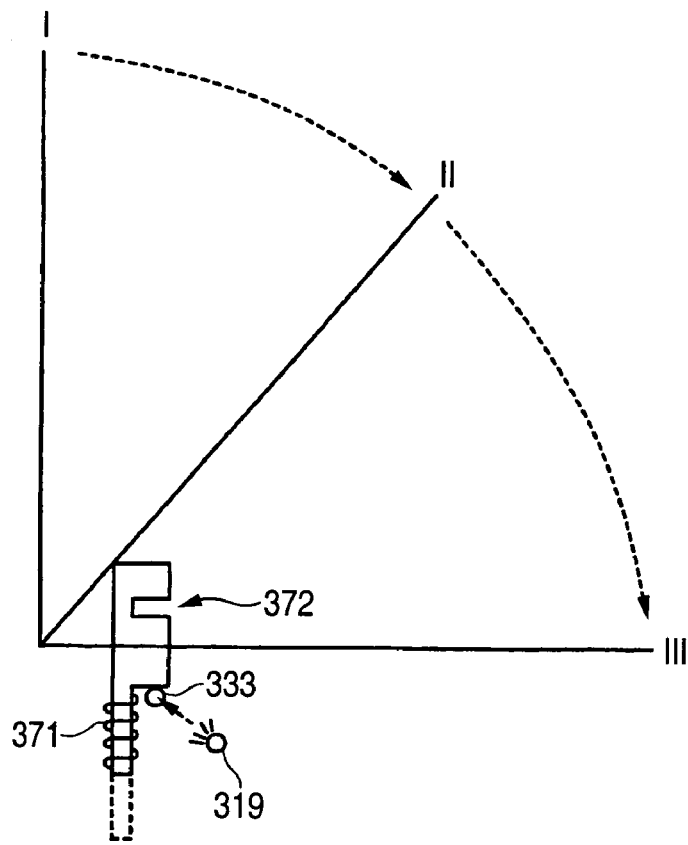
FIG. 23 is a schematic depiction according to the embodiment of the invention.
Figure 23B:
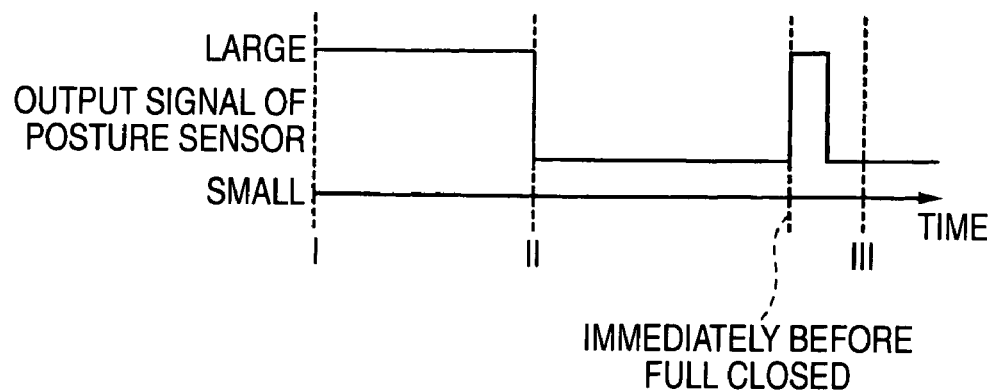

Although the document size is decided on condition that the original cover 313 takes the full closed position when the time t3 elapses after the LED 332 is turned off according to this embodiment of the invention, the movable member 18 so configured as shown in FIG. 23 is formed, whereby the timing of causing the posture sensor to make the original cover 313 take the position III immediately before the full closed condition is detected, so that second reading may be conducted with that timing.

FIG. 23 is a schematic depiction of the posture sensor capable of detecting the intermediate position as well as the position immediately before the full closed condition. As shown in FIG. 23, a depression 372 is formed in a movable member 371. When the original cover 313 changes from the full open position I to the intermediate position II, the movable member 371 is pressed down to block the light of the LED 319. When the original cover 313 takes a position immediately before the full closed condition, the photodiode 333 receives the light of the LED 319 passed through the depression 372 again. Thus, the timing of causing the original cover 313 to take the position III immediately before the full closed condition can be detected.

Fourth Embodiment

Figure 24:
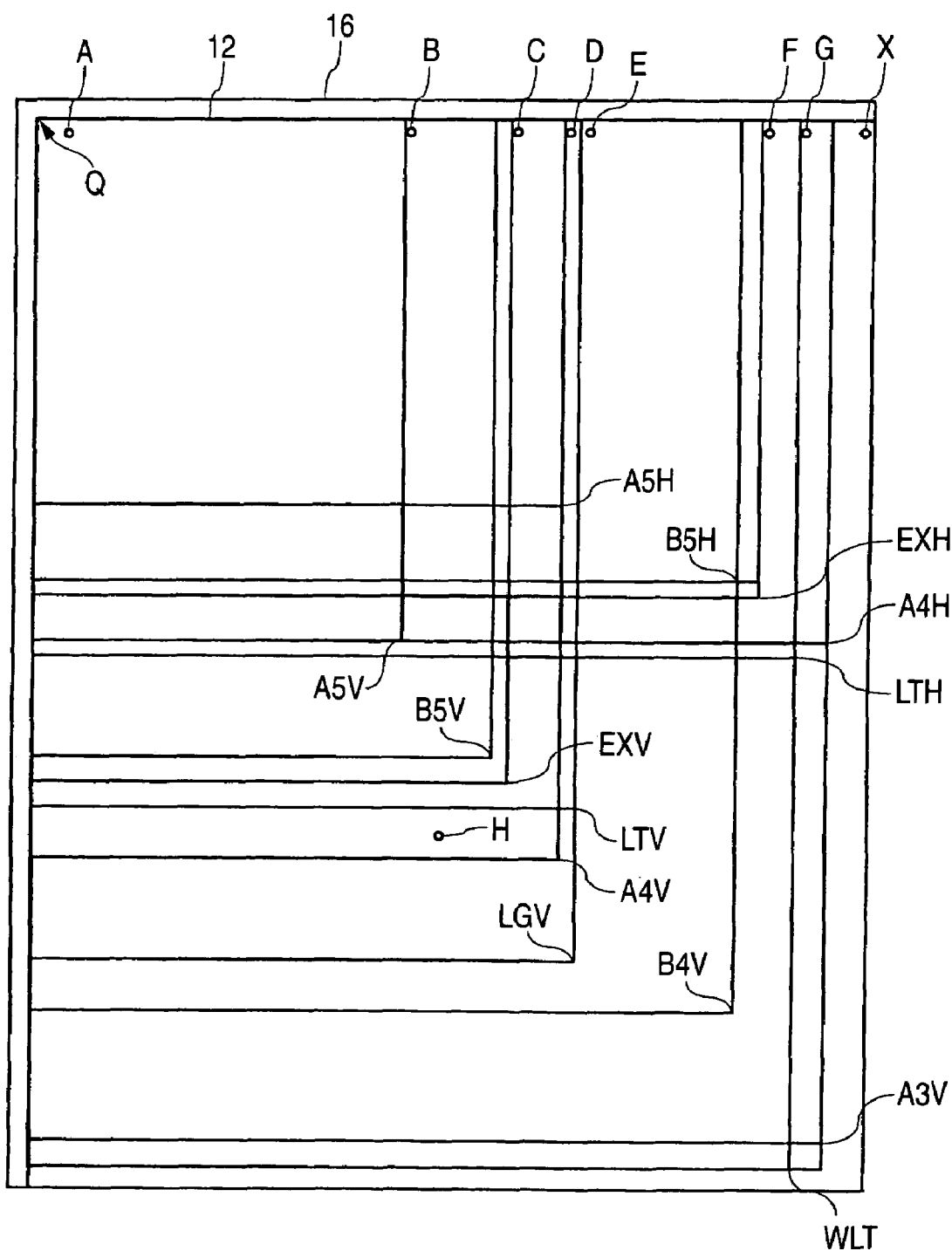
FIG. 24 is a plan view according to the embodiment of the invention.

A fourth embodiment of the invention will now be described, wherein substantially like component parts are given like reference characters according to the third embodiment thereof and the description thereof will be omitted. FIG. 24 is a schematic depiction of a designated placing and holding range corresponding to document size as an object of decision-making and the positional relation between detection positions according to the fourth embodiment of the invention; FIG. 25, a decision table according to the fourth embodiment of the invention, wherein a detection position X is added further according to the fourth embodiment of the invention. The detection position X is set outside the designated range of placing and holding paper of the maximum (A3V) size as an object of decision-making. According to the fourth embodiment of the invention, the quantity of light reflected from the detection positions A to G is decided in the order of G to A after the quantity of light reflected from the detection position X is decided.

Figure 26:
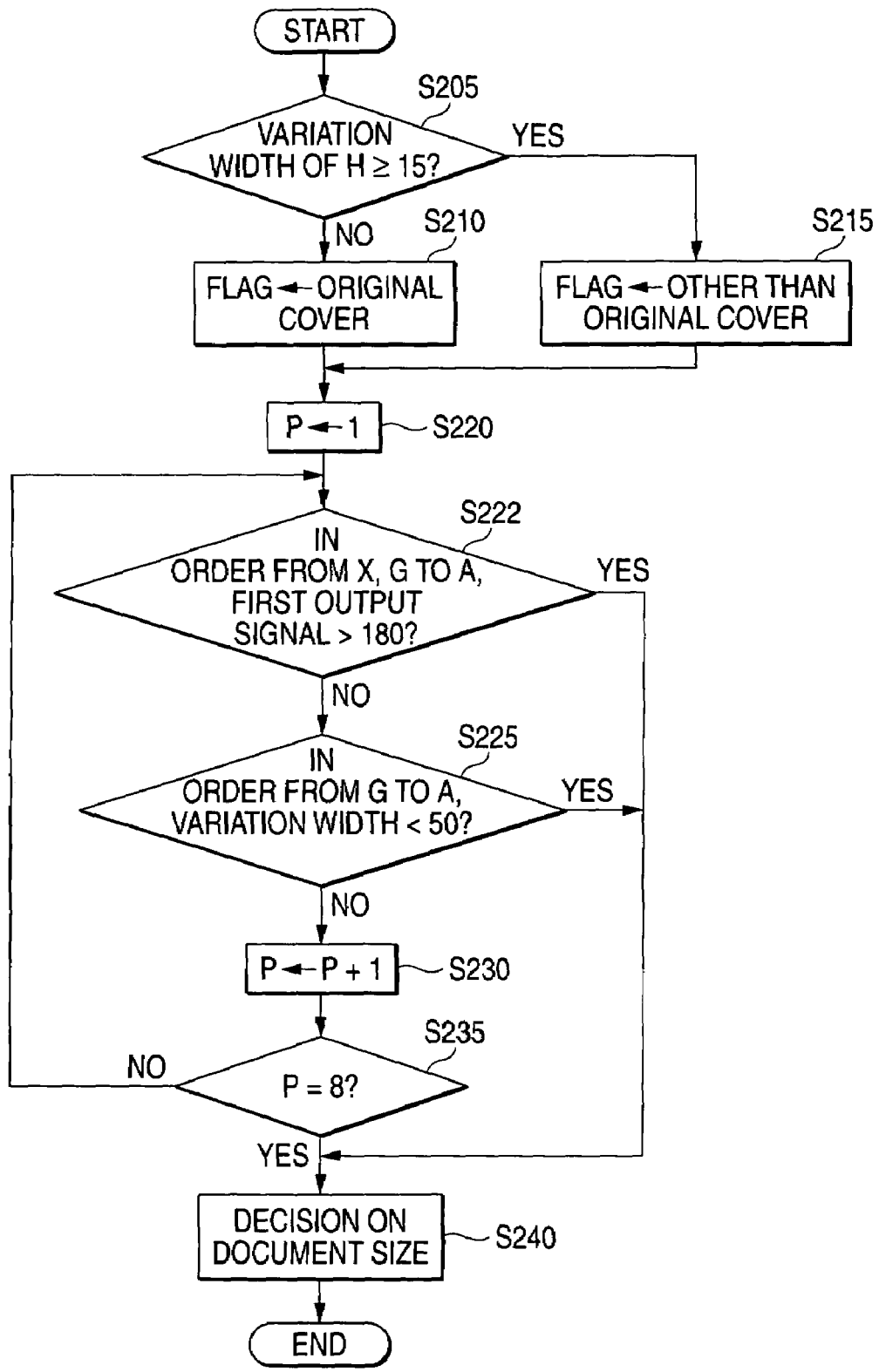
FIG. 26 is a flowchart according to the embodiment of the invention.
Figure 27:
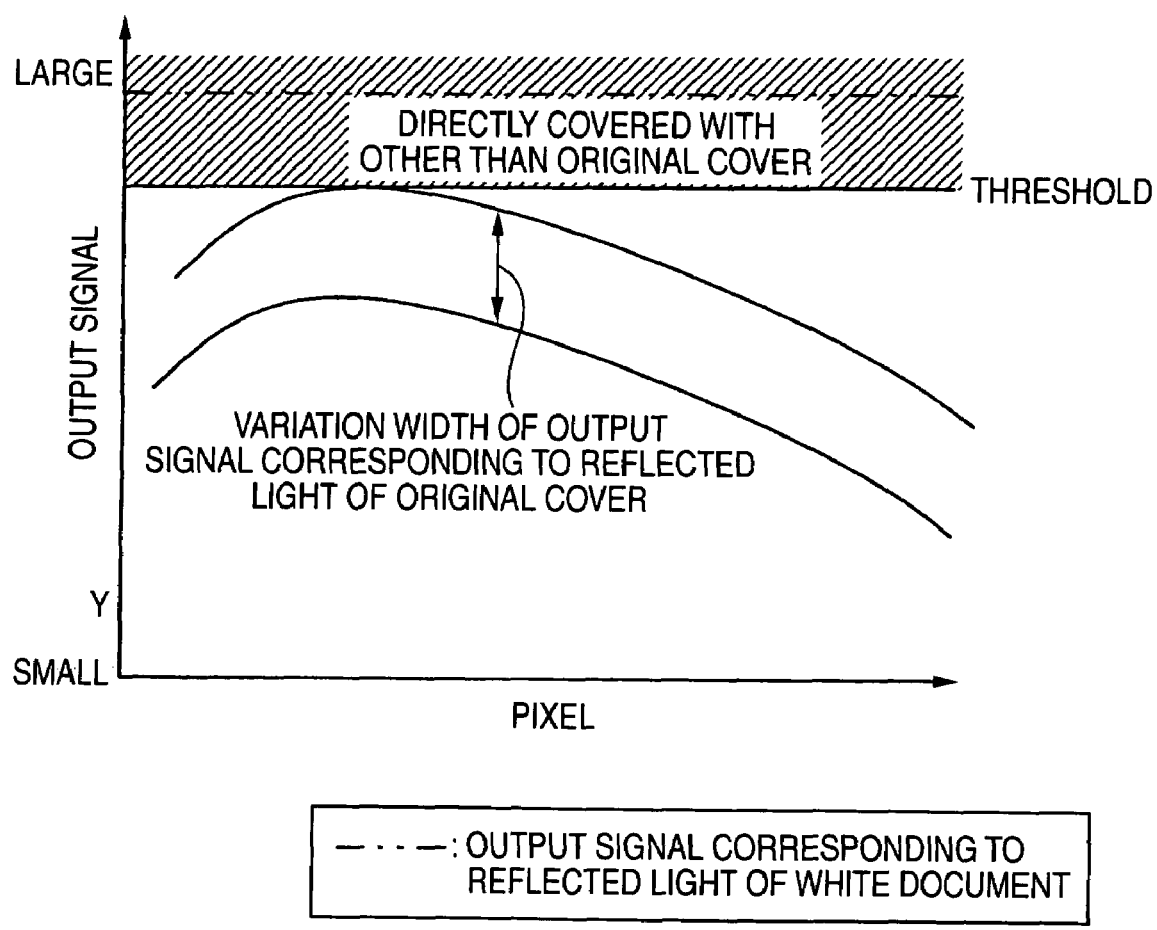
FIG. 27 is a graph according to the embodiment of the invention.

FIG. 26 is a flowchart showing the process of deciding the size of the document loaded on the surface of the original table 12 in the form of a flow according to the fourth embodiment of the invention.

A decision is made on whether the first output signal has a value greater than the designated in the order of H, G, F, E, D, C, B and A with respect to pixels corresponding to the detection positions of H and G to A at S222 before a decision is made on the variation width of the output signals of pixels corresponding to the detection positions of H and G to A at S225 according to the fourth embodiment of the invention. When the first output signal in each detection position has the value not less than the designated, the relevant detection position is decided as being directly covered with anything other than the original cover 313 and S240 is followed. When the first output signal in each detection position has the value not greater than the designated, S225 is followed and a decision is made again on whether the relevant detection position is directly covered with anything other than the original cover 313 on the basis of the variation width of the output signal. The designated value as a threshold is set 180, for example, according to the value of the signal outputted in conformity with the density of the white area of the document and the condition in which the original cover 313 is in the intermediate position.

At S222, further, the detection position may be decided as being directly covered with original cover 313 as the first output signal exists within a range of one optional value to another. In other words, when the value of the first output signal of a pixel corresponding to any detection position is in a designated up-and-down range from the value of the signal outputted from the pixel with the original cover 313 remaining in the intermediate position, the detection position may be decided as being directly covered with the original cover 313. In this decision method, the threshold is individually set to each detection position. In this decision method, moreover, any object of reading other than a colorless transparent film never becomes undetectable and any document size can be decided with great accuracy.

At S240, the paper size is decided according to the decision table of FIG. 25. According to the fourth embodiment of the invention, document size is decided to be undecidable when the detection position X is directly covered with anything other than the original cover 313. When all of the detection positions A to H are decided as being directly covered with the original cover, moreover, they are decided as being not loaded on the original table 312.

As shown in FIG. 24, further, the following effect is made achievable when a document of size not intended for decision is placed and held by setting each of the detection positions B to G in the vicinity of the outer edge of the designated placing and holding range outside the designated placing and holding range. For such a document of size not intended for decision, a reading area can be set from the result of deciding the document size so that the whole range of even the document of size not intended for decision because the size of the document is decided to be greater than the actual size.

Fifth Embodiment

A fifth embodiment of the invention will now be described. According to the fifth embodiment of the invention, the output signal of a pixel corresponding to each of the detection positions at S145 as shown in FIG. 20 is stored in the RAM 353 as follows; three pixels least apart from each other are arranged in the respective light receiving parts in the channels of RGB mutually different from each other as pixels corresponding to one detection position and the output signals of these pixels are individually stored in the RAM 353.

When the variation width of the first output signal and the second output signal of each pixel corresponding to the one detection position at S225 of FIG. 21 or FIG. 26 is decided, the variation width of the output signal of each pixel stored in the RAM 53 is individually decided. Consequently, when the variation width of the output signal at not less than one pixel with respect to the one detection position has a value smaller than the designated, the detection position is decided as being directly covered with anything other than the original cover 313 and S240 is followed then.

The variation width of the plurality of pixels in one detection position is thus individually decided and when the variation width of not less than one pixel has a value less than the designated, the relevant detection position is decided as being directly covered with anything other than the original cover 313, so that the following incorrect decision becomes reducible. When the document is caused to slip out of place by closing the original cover 313, the shading of the document may change in its position corresponding to one pixel on the surface of the original table 312 before and after the original cover 313 is closed. When a decision is made on whether one detection position is directly covered with the original cover 313 by only the variation width of the output signal of one pixel, there may be formed incorrect decision. Even when the document is caused to slip out of place by closing the original cover 313, on the other hand, the shading of the document may not change in its position corresponding to one pixel on the surface of the original table 312 before and after the original cover 313 is closed. Therefore, in case there exist even one pixel with the variation width of the output signal being small out of the plurality of pixels in one detection position, incorrect decision is made reducible by deciding the detection position as being directly covered with the original cover. Although the variation width of the output signal of each one of pixels may be decided individually by the plurality of light receiving parts corresponding to the plurality of channels RGB as described above, incorrect decision is also made reducible for the same reason by deciding the variation width of the output signals of the plurality of pixels individually with the plurality of light receiving parts corresponding to the plurality of channels of RGB or deciding the variation width of the output signals of the plurality of pixels with one light receiving part corresponding to one channel.

What is claimed is:

1. An image reading apparatus comprising:
a transparent original table including a surface on which a document is to be placed;
a light source that irradiates the original table from the back side;
an image sensor that reads the document by subjecting to photoelectric conversion of light reflected from the document placed on the surface of the original table;
an original cover that is made pivotable from a first position to leave open the surface of the original table to a second position to cover the surface of the original table therewith;
a first optical system that forms a first optical path led from an area on a main scanning line in parallel to the axis in a longitudinal direction of the image sensor on the surface of the original table to the image sensor;
a second optical system that forms a second optical path led from an area apart from the main scanning line in a sub-scanning direction perpendicular to the main scanning line on the surface of the original table;
a subscanning unit that moves the main scanning line in parallel to the sub-scanning direction on the surface of the original table, the sub-scanning unit including a carriage on which the image sensor, the first optical system and a part of the second optical system are mounted and a controller for reciprocating the carriage in the sub-scanning direction; and;
a document size decision unit that decides a size of the document placed on the surface of the original table on the basis of a change in quantity of light incident on a predetermined pixel of the image sensor when the carriage is placed at a predetermined position in which both the first optical path and the second optical path are formed by said light which is reflected from the document irradiated by the light source during the time the original cover pivots between the first position and the second position, the first optical path and the second optical path are disposed below the original table.

2. The image reading apparatus according to claim 1, wherein the document size decision unit decides that an area on the surface of the original table is directly covered with something other than the original cover when said original cover is in said first position based upon a pixel quantity of light incident on and reflected from said something which covers the original table.

3. The image reading apparatus according to claim 1, wherein the document size decision unit decides the size of the document on the basis of the quantity of light incident on a pixel of the image sensor within a range which is defined on the surface of the original table, said original table being covered with the original cover, said document being located outside a designated placing range of a document of maximum decidable size, and the quantity of light incident on a pixel of the image sensor being within the designated placing range of the document of maximum decidable size.

4. The image reading apparatus according to claim 1, wherein the image sensor includes a plurality of light receiving parts spaced apart from each other, each of the light receiving parts including a plurality of pixels arranged in parallel to a main scanning line, and the document size decision unit decides the size of the document on the basis of the quantity of light incident on the plurality of pixels which are arranged in the light receiving parts different from each other and which are close to each other.

* * * * *